Figure 1:
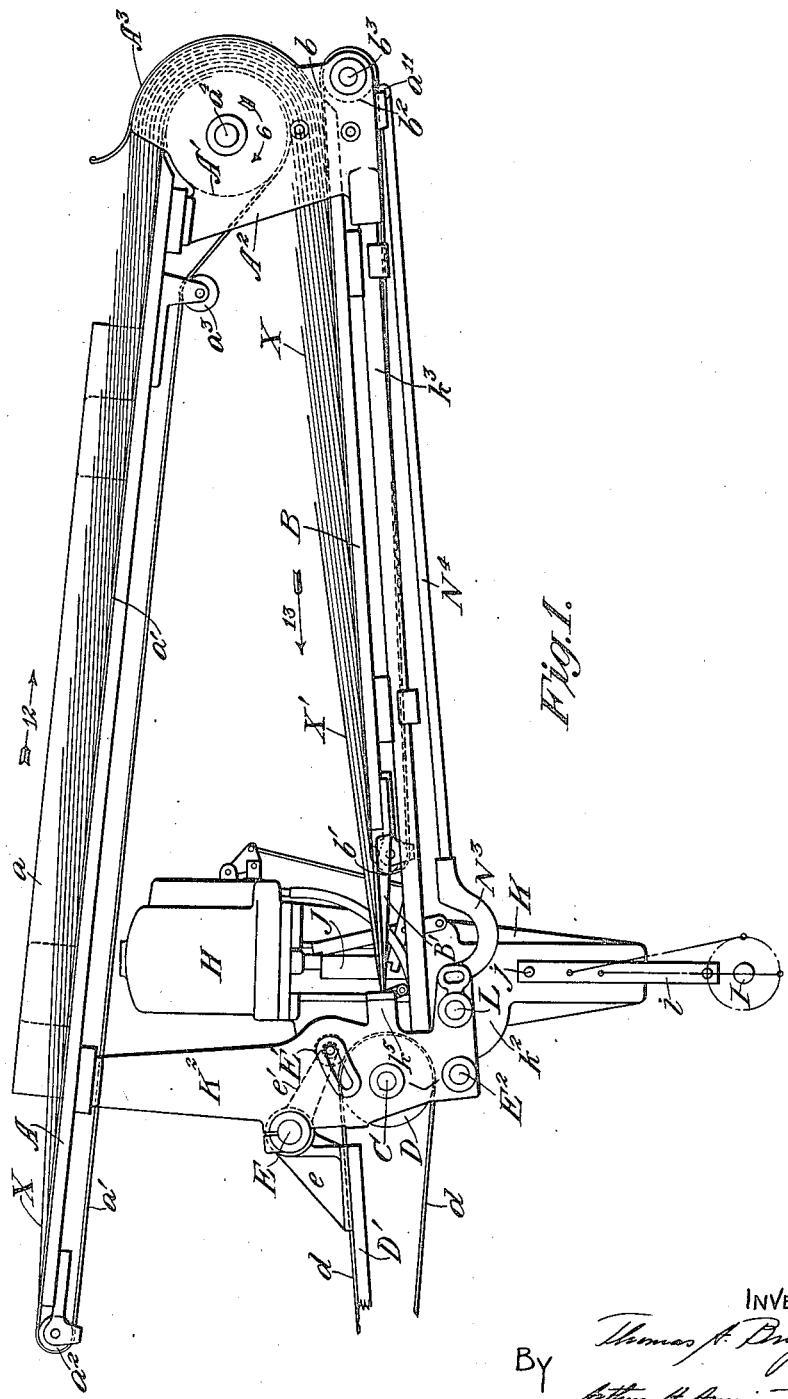

T. A. BRIGGS.
SHEET FEEDING MACHINE.
APPLICATION FILED SEPT. 1, 1915.

1,259,598.

Patented Mar. 19, 1918.
8 SHEETS—SHEET 1.

INVENTOR
Thomas A. Briggs
BY
Arthur H. Amington
ATTORNEY

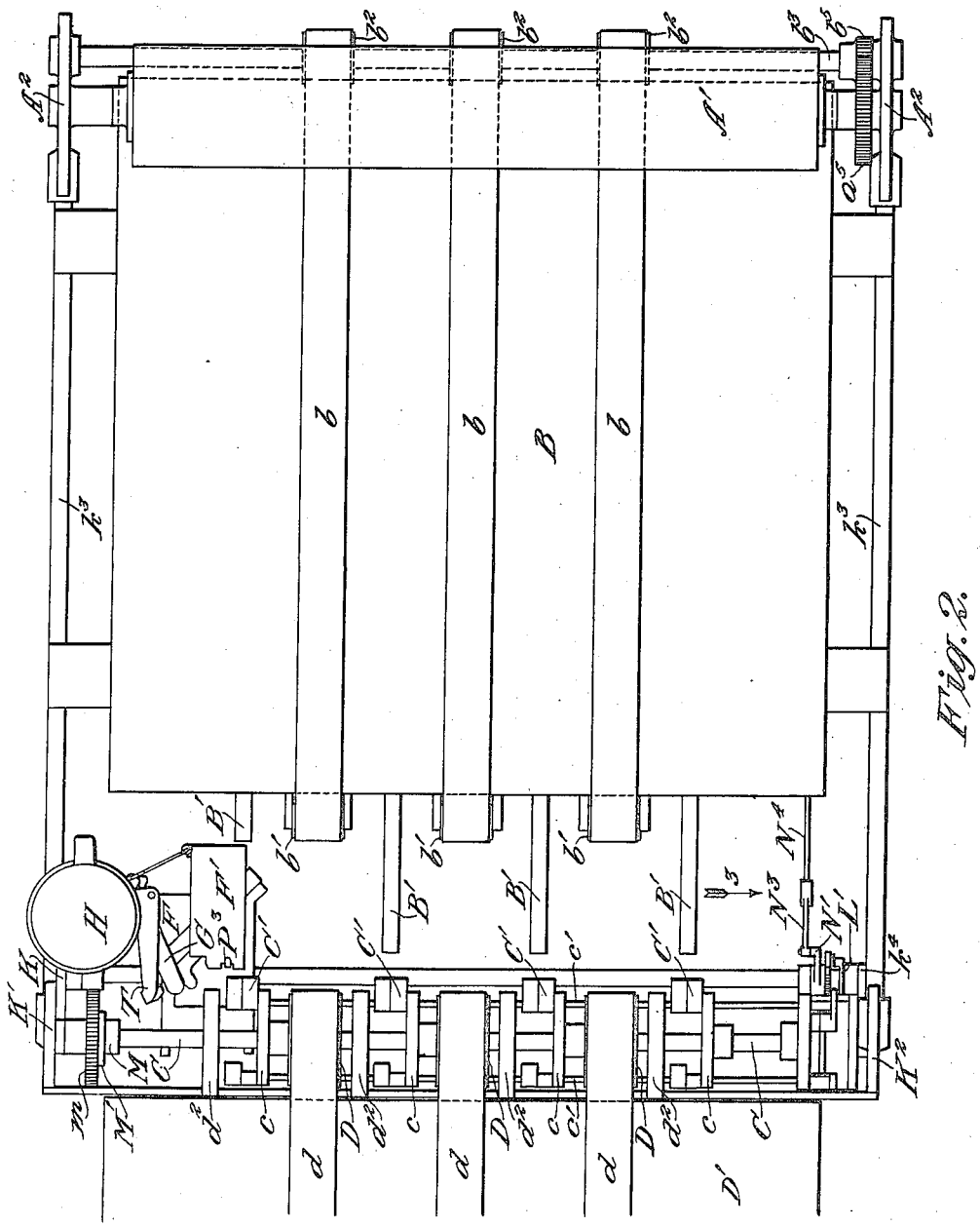

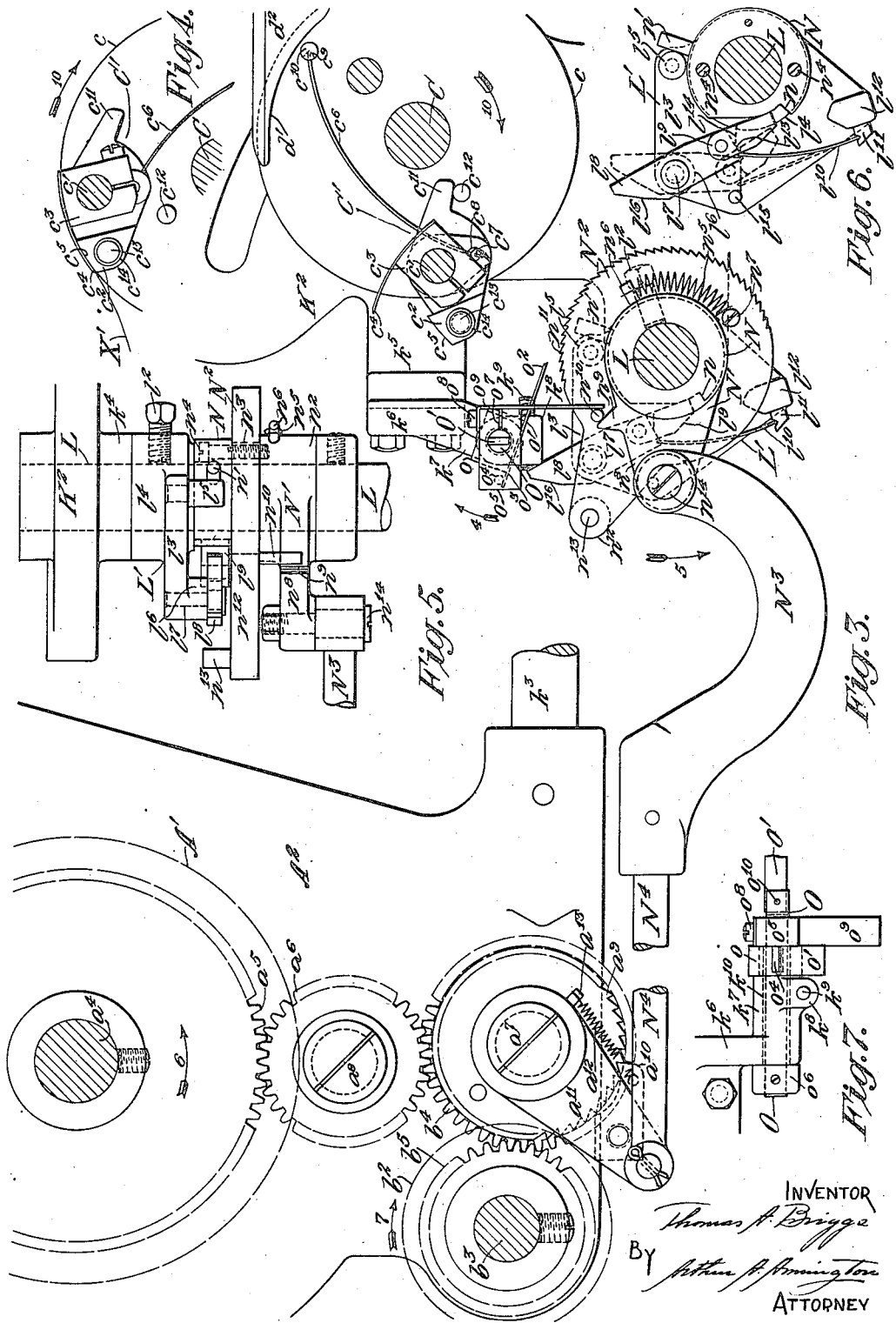

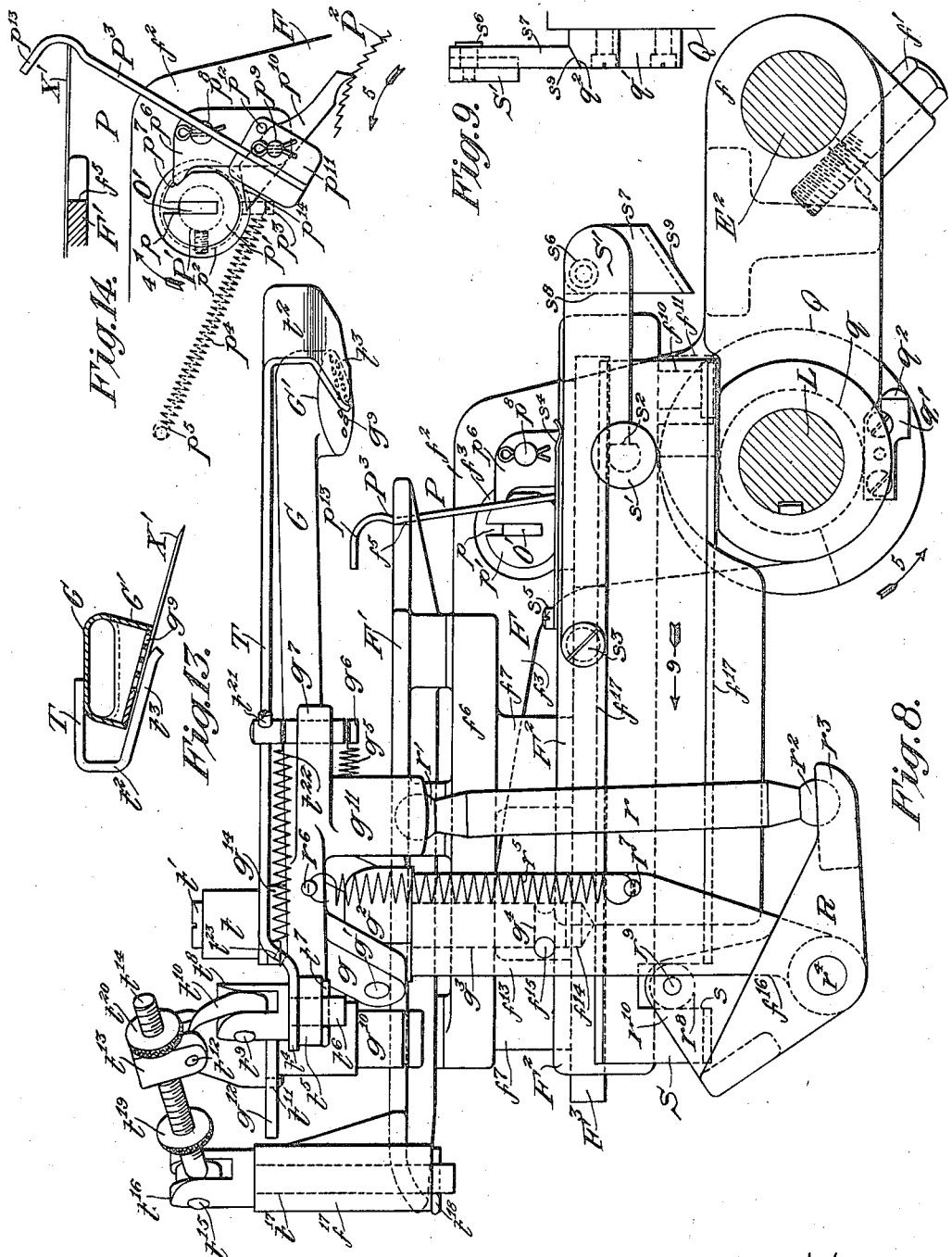

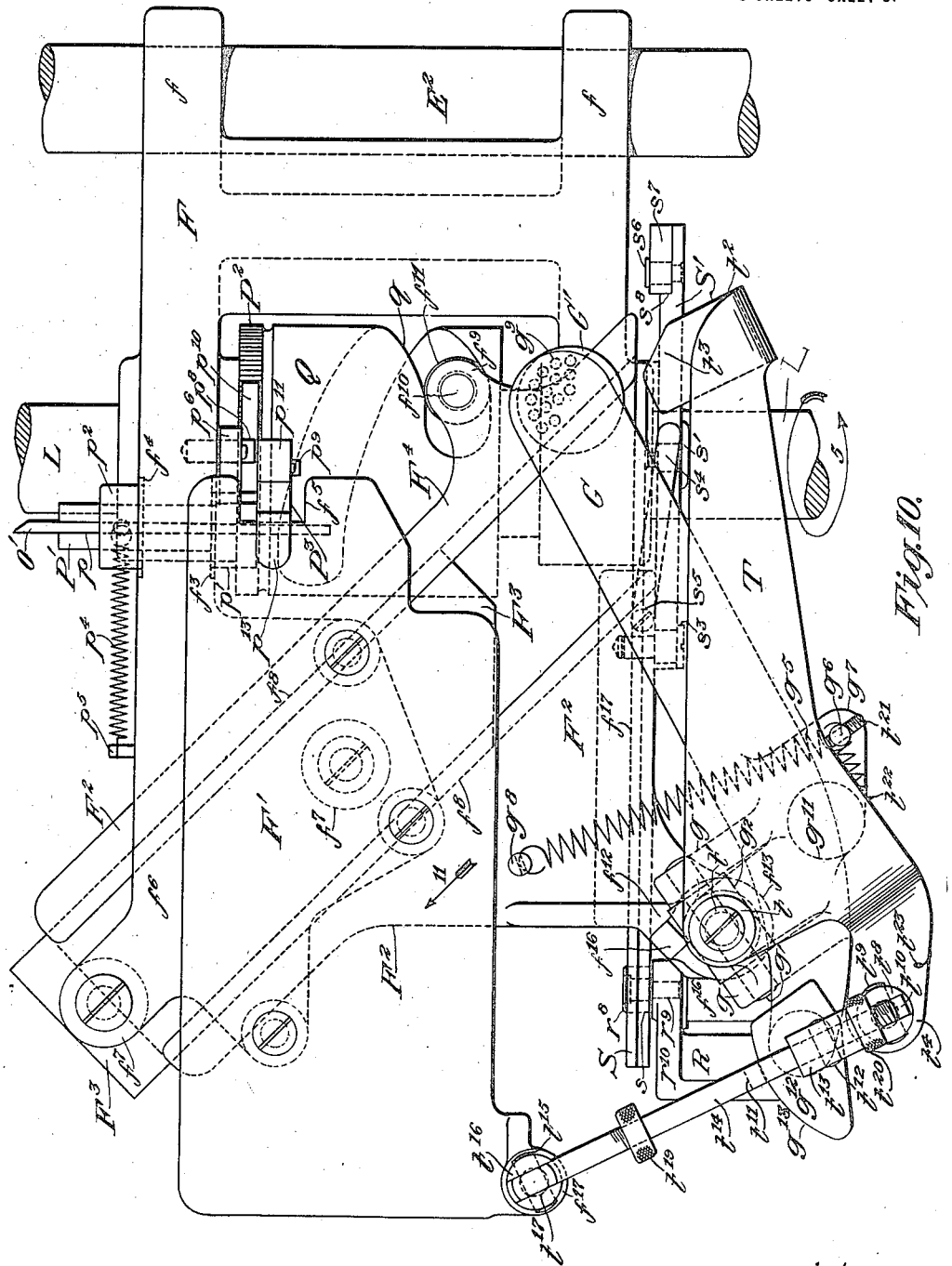

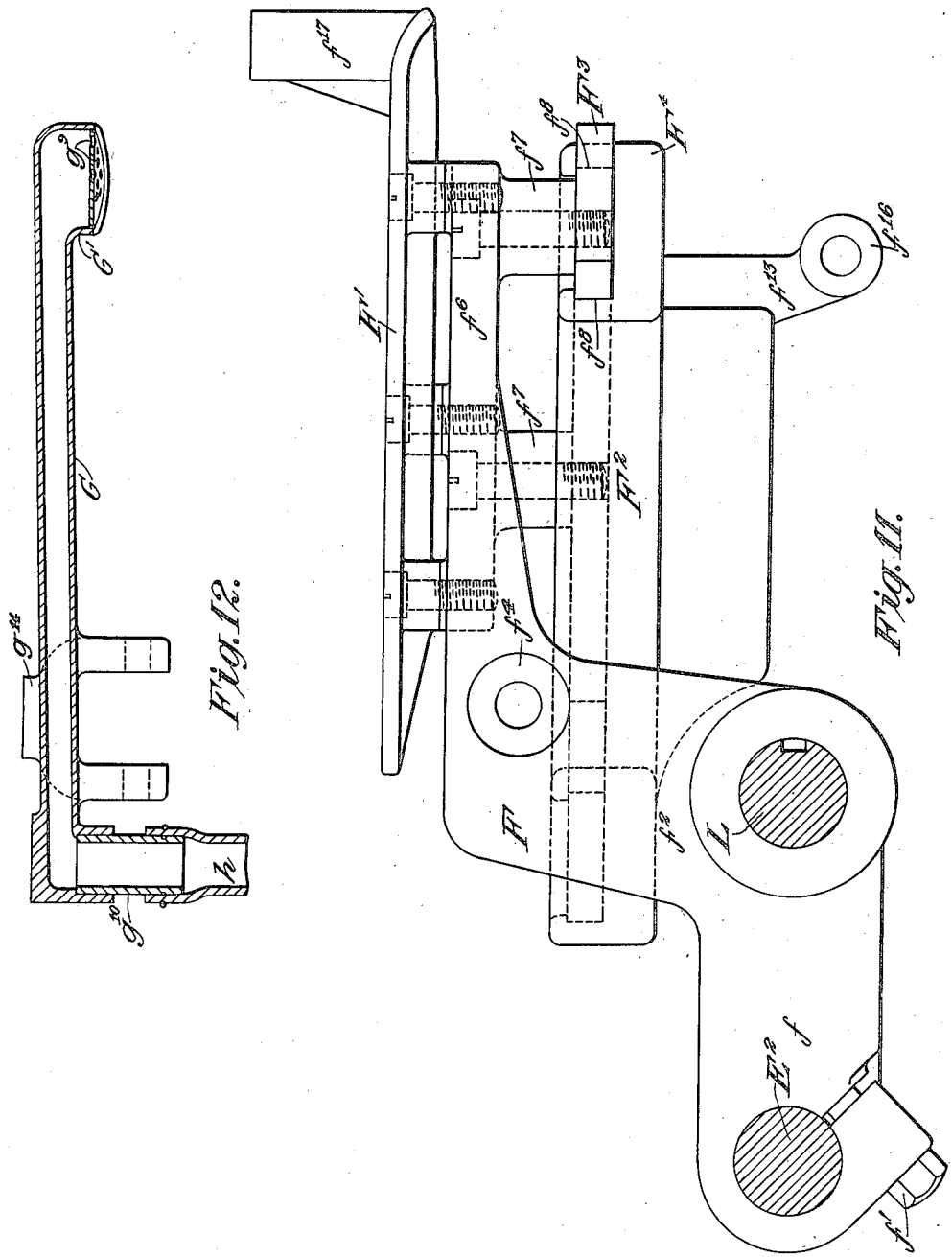

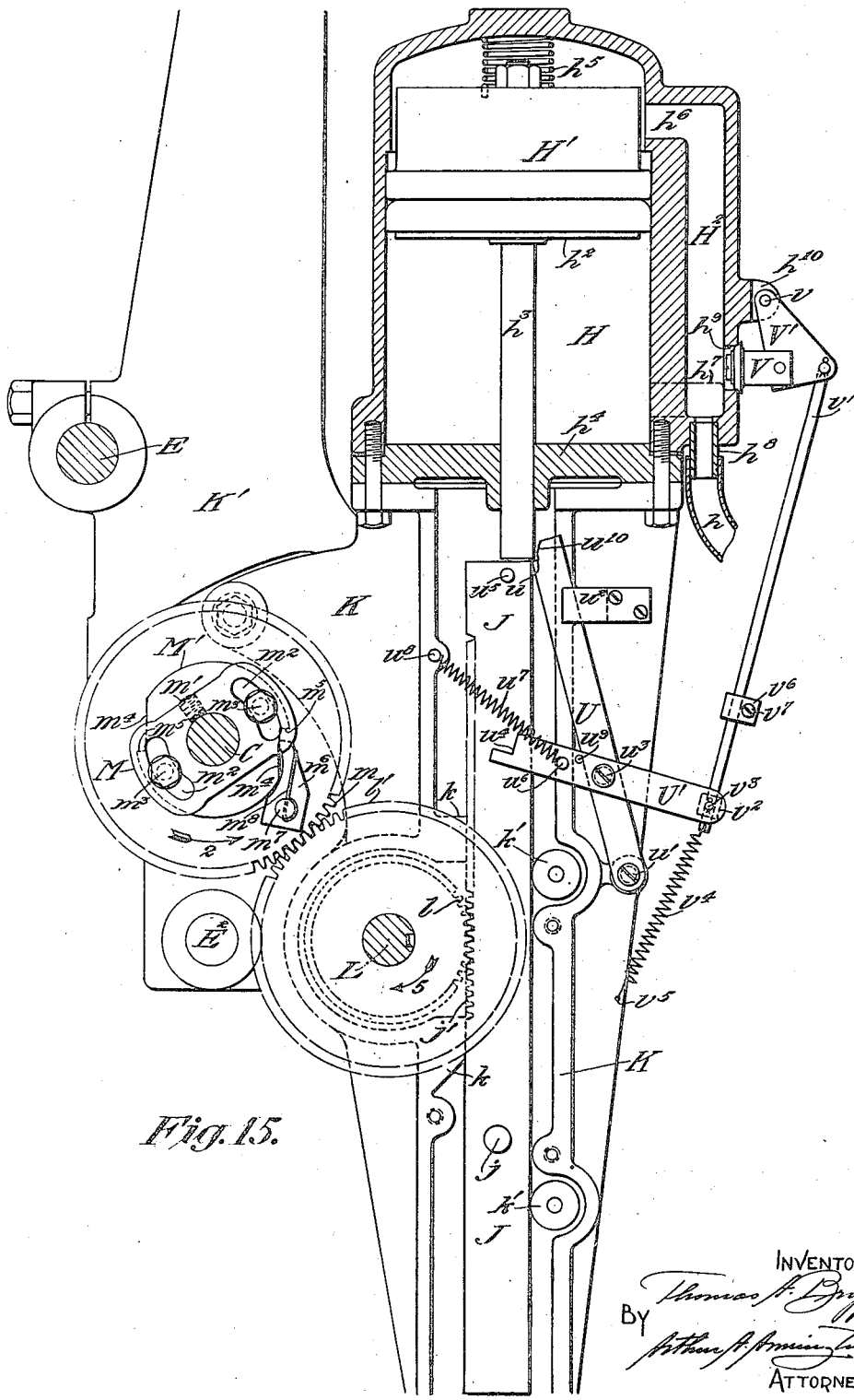

T. A. BRIGGS.
SHEET FEEDING MACHINE.
APPLICATION FILED SEPT. 1, 1915.

1,259,598.

Patented Mar. 19, 1918.
8 SHEETS—SHEET 8.

INVENTOR
Thomas A. Briggs
BY
Arthur J. Pennington
ATTORNEY

UNITED STATES PATENT OFFICE.

THOMAS A. BRIGGS, OF EAST GREENWICH, RHODE ISLAND, ASSIGNOR TO BOSTON WIRE STITCHER COMPANY, OF PORTLAND, MAINE, A CORPORATION OF MAINE.

SHEET-FEEDING MACHINE.

1,259,598.

Specification of Letters Patent.

Patented Mar. 19, 1918.

Application filed September 1, 1915. Serial No. 48,531.

*To all whom it may concern:*

Be it known that I, THOMAS A. BRIGGS, a citizen of the United States, residing at East Greenwich, in the county of Kent, State of Rhode Island, have invented certain new and useful Improvements in Sheet-Feeding Machines, of which the following is a specification.

My invention consists of improvements in paper-feeding machines for delivering sheets of paper to printing-presses, folding- and ruling-machines, or other like apparatus. The object of my improvement is to provide a device for this purpose, capable of feeding a practically continuous supply of sheets from a pile or stack, one after another in rapid succession, with each sheet regularly timed to follow underneath the previously fed sheet in overlapped relation therewith, and with a plurality of sheets all feeding forward at the same time. With this object in view my improved device consists particularly in a novel arrangement of means for separating the individual sheets from the supply-bank; shaking each sheet free from those underneath; feeding it forward to the intermittently-operated delivery belts; reaching in under the sheet first operated upon to grasp and feed forward the next sheet, and so on in such manner that the sheets may be delivered in overlapped relation in rapid succession to provide a substantially continuous supply.

My invention embraces several novel features, the most important of which are as follows: First, the means for separating the top sheet from those underneath by suction and then gripping it positively by inserting an element beneath it; second, the shaking of the sheet mechanically to free it from the sheets under it; third, the method of grasping the sheet at one corner only; fourth, the method of moving the sheet obliquely forward or diagonally in relation to its side edge instead of with a straight-line movement; and fifth, the method of reaching in under a sheet already fed forward to lift and feed the next sheet from the bank before the first one is fed clear thereof. Through these novel features in the means for and method of feeding the sheets I attain a maximum speed of delivery of the sheets, a more accurate and reliable feeding thereof, and other important advantages as hereinafter more specifically pointed out.

The invention is fully described in the following specification, illustrated by the accompanying drawings, in which like reference characters designate like parts. In the drawings:—

Figure 1 is a side elevation of my improved feeding-mechanism in general, showing it applied to the upper loading-table or supply-board and the lower feed-board of the machine;

Fig. 2, a general plan view of the lower feed-board showing the relation of the paper-feeding mechanism thereto;

Fig. 3, an enlarged side elevation of the driving-connections for the feeding-mechanism and also illustrating the rotary paper-clips or edge-grippers;

Fig. 4, a detail view of the rotary paper-clip or edge-gripper shown in Fig. 3;

Figs. 5, 6 and 7, views in detail of the pawl-and-ratchet means for the driving connections of the feeder;

Fig. 8, a side elevation of the suction-lifter and positive paper-gripping means of the separator-device shown in connection with their operating mechanism;

Fig. 9, a detail view of a portion of the operating-mechanism for the suction-lifter and positive gripping-means;

Fig. 10, a plan view of the suction-lifter and positive gripper-mechanism;

Fig. 11, a side elevation of the reciprocatable slide or cross-head on which the suction-lifter and positive paper-gripping means are mounted;

Figure 16:
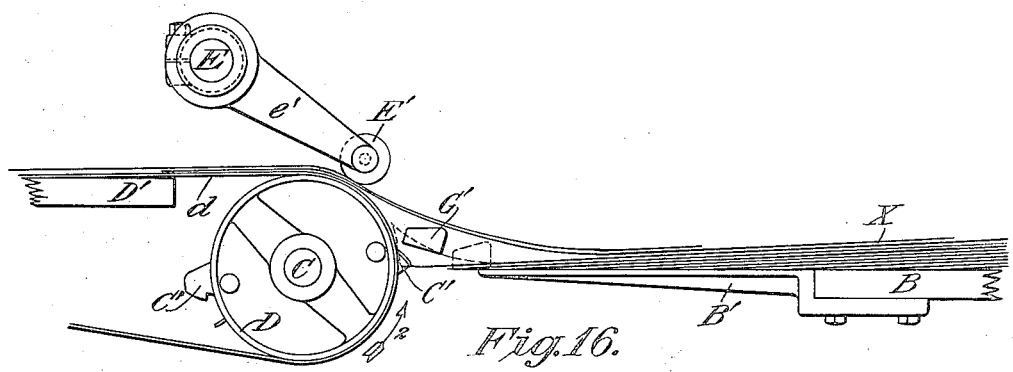
Figure 17:
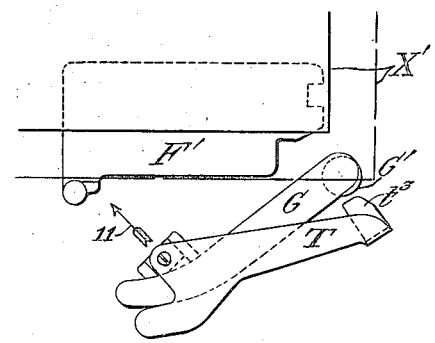
Figure 18:
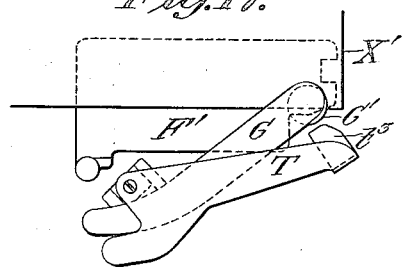
Figure 19:
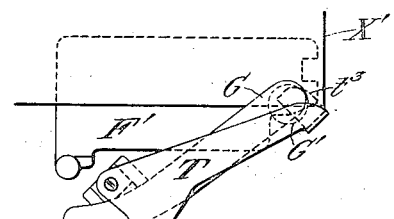
Figure 20:
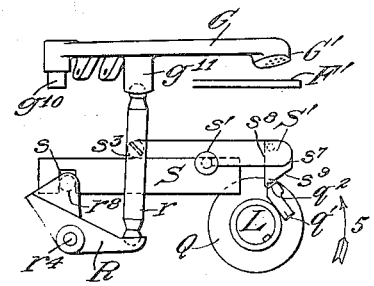
Figure 21:
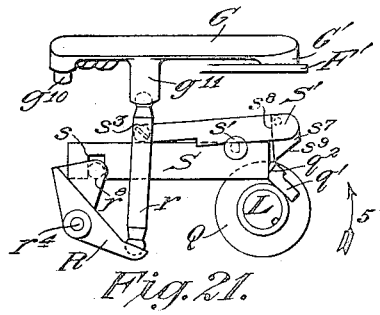
Figure 22:
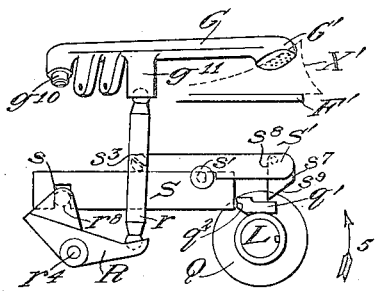

Fig. 12, a longitudinal, sectional view of the suction arm and shoe;

Fig. 13, a sectional, detail view of the suction-shoe and positive paper-gripper showing them in operative relation while engaging a sheet of paper;

Fig. 14, a detail view of the sheet-operated tripping-device for the operating-means of the feeding-mechanism;

Fig. 15, an axial, sectional view of the air-pump or vacuum-device for the suction-means showing the operating-mechanism therefor;

Fig. 16, a side elevation of the rotary paper-clip or edge-gripping mechanism showing its relation to the lower feed-board;

Figs. 17, 18 and 19, reduced, diagrammatic, plan views of the suction-arm and positive sheet-gripper shown in different operative positions in relation to the sheet of paper being operated upon; and Figs. 20, 21, and 22, corresponding diagrammatic views of the suction-arm and its operating-means in elevation.

*The apparatus in general.*—Referring first to Fig. 1, A designates the upper, inclined loading-table or supply-board adapted to receive a combed out pile or stack of sheets X, and provided at one side with a loader-gage $a$ against which the edges of the sheets are placed to bring them into proper alinement. Traversing the top of the board A are a plurality of endless bands or feed-belts $a'$ which pass around the end idler-pulleys $a^2$, thence underneath the board A, over the idlers $a^3$ and around a cylindrical feed-drum or roll A' which is adapted to be rotated through means hereinafter described. Beneath the loading-table A and feed-roll A' is the lower feed-board B, inclined in the opposite direction and arranged to receive the sheets X as they feed down from the board A around the roll A'. The feed-roll A' is mounted fast on a shaft $a^4$ journaled in bearings in the side-frames $A^2$, which also support the boards A and B, and is partly surrounded by a semi-cylindrical cowl or hood $A^3$ having a flaring mouth which acts as a guide to direct the sheets X down onto the top of the board B. The feed-board B also has a plurality of endless feed-belts $b$ overlying and traversing its upper face, see Fig. 2, and passing underneath the board and around the pulleys $b'$, $b^2$. The belts $b$ are driven from pulleys $b^2$ which are mounted fast on a transverse shaft $b^3$ adapted to be rotated in unison with the feed-roll A' by means of the gears $a^5$, $a^6$ and $b^4$, $b^5$, shown in Fig. 3 and more particularly described hereinafter. Projecting from the forward end of the board B are a plurality of brackets or arms B' which support the ends of the sheets of paper X as they feed off from the board, see Figs. 1, 2 and 16. Adjacent the ends of the arms B', in advance thereof, is a transverse shaft C which supports a series of gripper-rolls or disks $c$ carrying edge-grippers or clips C' which seize the edge of the sheet of paper as it is fed thereto to draw it forward onto the delivery-belts $d$. As illustrated in Figs. 1 and 2, the belts $d$ are driven from pulleys D, rotated by the shaft C, to traverse them across the top of a delivery-board or table D'. The belts $d$ pass around suitable idlers, not here shown, mounted at the forward end of the board D', and thence back underneath the board to the pulleys D. Extending through brackets $e$ fastened to the top of the board D' is a transverse rod E on which are mounted a series of arms $e'$ having rider-rolls E' journaled at their ends. The rolls E' bear on the sheets X above the pulleys D to maintain them in frictional contact with the belts $d$ so that they will be fed forward thereby after their edges have been released from the revolving clips C', see Fig. 16.

Positioned at the further side of the machine, as viewed in Figs. 1 and 2, is the sheet-separator or lifting-device F, represented merely in outline in these views, but shown more in detail in the enlarged drawings Figs. 8 to 14 inclusive. The sheet-separating means F is arranged between the forward end of the feed-board B and the edge-gripper shaft C and is preferably adjustable laterally of the machine to adapt it for different widths of paper. As shown in Fig. 2, the further paper-supporting arm B' on the board B is made shorter than the other arms to adapt the separator-table or platen F' to be adjusted in position in front of it. The separator-device F comprises essentially a suction-lifter in the form of an oscillating arm G which is connected to a suction-pump or vacuum-device shown at H. The pump H is operated from a crank, or eccentric rotated by the shaft I, see Fig. 1, arranged below the machine and driven from any suitable source of power. Usually, the crank-shaft I is connected to the driving-shaft of the press or other machine to which the feeder is applied, but it might take its power from any other convenient source as desired. The operating shafts for the other parts of the feeding-mechanism also derive their motions from the crank-shaft I, as later explained, and for the sake of convenience in describing the driving-connections the continuously - oscillated transverse shaft L will be considered the main operating shaft.

*The driving connections.*—Referring to Fig. 1, the crank-shaft I is connected by a pitman $i$ to a reciprocatable rack-bar J, see Fig. 15, by means of the wrist-pin $j$. The rack J slides in bearings in a frame K which supports the pump-cylinder H and is fastened to a side bracket K'. The bracket K' supports the ends of the boards A and B and also the cross-rod E, see Fig. 15, on which are mounted the brackets $e$ as previously described. At the opposite side of the machine, that is the front side, as viewed in Figs. 1 and 2, is a bracket $K^2$ corresponding to the bracket K' and supporting the rod E at its other end, while a lower transverse tie-rod $E^2$ also connects the two brackets K', $K^2$ together. One side of the rack J bears against bearings $k$, $k$ on the frame K, see Fig. 15, while its opposite side rides on rollers $k'$, $k'$ to reduce the friction. A suitable plate or cover $k^2$, indicated in Fig. 1 but not shown in Fig. 15, is secured to the side of the frame K to protect the parts inclosed therein. The teeth $j'$ on the side of the rack J mesh with the teeth of a gear $l$ which is keyed to the previously mentioned shaft L, the latter being journaled in bearings in the opposite side-frames K', K², and also passing through the frame K. The shaft L also carries fast thereon a larger gear $l'$, meshing with a gear $m$ which is free to turn on the shaft C, hereinbefore mentioned as the intermittently-rotated edge-gripper-shaft. Secured fixedly to the shaft C by means of a set-screw $m'$ is a flange or head M formed with opposite concentric slots $m^2$. Mounted on the shaft C abutting the side of the flange M is a disk M' which is fastened to the flange by means of bolts $m^3$ extending through the slots $m^2$. The disk M' is thus secured rotatively with the shaft C to adapt it to be adjusted about the axis of the latter by simply loosening the bolts $m^3$. The periphery of the disk M' is flatted off at $m^4$ to form two diametrically opposed shoulders $m^5$ adapted to be engaged by the toe of a pawl $m^6$ carried by the loose gear $m$. The pawl $m^6$ is pivoted on a stud $m^7$ and a wire spring $m^8$, inserted through a hole in the stud, bears against its end to maintain its toe in engagement with the periphery of the disk M'. The gear $l$ is rotated back and forth from the reciprocating motion of the rack J through an arc of a little more than 180 degrees or approximately one-half of a complete revolution in each direction. The gear $l'$ turning with the gear $l$ will therefore rotate the gear $m$ back and forth to the same extent and this movement is transmitted through the pawl $m^6$ to turn the disk M' intermittently forward a half revolution at each operation. The shaft C is thus turned progressively forward in the direction indicated by the arrow 2, Figs. 15 and 16, to operate the edge-grippers on the disk C in a manner as more fully explained hereinafter.

*The ratchet-mechanism for the driving connections.*—Turning now to Fig. 3, it is to be understood that this is a view looking in the opposite direction from that of Figs. 1 and 15. That is to say, Fig. 3 shows the driving-connections for the feeder-mechanism as viewed from the rear side of the machine or in the direction indicated by the arrow 3, Fig. 2. Illustrated in Fig. 3 are portions of the side-frame A² for the feed-roll shaft $a^4$ and the bracket or frame K² for the edge-gripper-roll shaft C. As before indicated these brackets are arranged in pairs on opposite sides of the machine and are connected by the longitudinal tie-rods $k^3$, see Figs. 1 and 2. Mounted on the end of the main operating shaft L adjacent the inside face of the frame K² is a pawl-and-ratchet mechanism, shown at the right in Fig. 3, for transmitting motion to the feed-roll-shaft $a^4$ and the belt-pulley shaft $b^3$. Secured to the shaft L abutting the side of the bearing-hub $k^4$ on the bracket K², see Fig. 5, is a member L', held in place by the set-screw $l^2$. As shown most clearly in Fig. 6, the member L' is formed with an irregularly-shaped plate or flange $l^3$ extending from its hub $l^4$, and carrying on its side a horizontally-projecting pin $l^5$. The flange $l^3$ is formed with a boss $l^6$ projecting from its side and carrying a headed stud $l^7$ riveted therethrough to serve as a pivot for a rockable lever $l^8$. Pivotally mounted on the lower end of the lever $l^8$ is a pawl $l^9$ arranged with its toe adapted to engage a shoulder $n$ on the periphery of a collar N abutting the hub $l^4$ of the member L'. A flat, bowed spring $l^{10}$ is held at one end in the notched side of a pin $l^{11}$, which is driven into a lug $l^{12}$ on the flange $l^3$, while its opposite end engages a notch in the end of the lever $l^8$. The pawl $l^9$ straddles the sides of the lever $l^8$ and is slotted to provide two flat faces $l^{13}$ and $l^{14}$, see Fig. 6, which strike against the end of the lever to limit the movement of the pawl in either direction. The spring $l^{10}$ tends to normally rock the lever $l^8$ to maintain the pawl $l^9$ bearing on the periphery of the collar N and a pin $l^{15}$ driven into the side of the flange $l^3$ acts to limit movement of the lever in the opposite direction to prevent displacement of the spring. At its upper end the rear side of the lever $l^8$ is beveled off at $l^{16}$ for a purpose as later described.

The collar N is mounted free to rotate on the shaft L and a pin $n'$ projecting radially from its periphery is adapted to be engaged by the pin $l^5$ on the side of the flange $l^3$ of the member L' to rotate the collar as later explained. Abutting the side of the collar N is a member N', see Fig. 5, formed with a hub $n^2$ reduced in diameter at $n^3$ to receive a ratchet-disk N² which is free to turn thereon. The collar N is secured to the hub $n^2$ of the member N' by means of suitable screws $n^4$, see Figs. 5 and 6, so that the two parts will rotate together, and the side of the collar N bears against the side of the ratchet N² to hold the latter in place on the reduced portion of the hub $n^2$. The ratchet N² is connected rotatively with the member N' by resilient means consisting of the coil-spring $n^5$ wrapped around the hub $n^2$, Fig. 3. One end of the spring $n^5$ is held by a pin $n^6$ driven into the hub $n^2$ while its opposite end is fastened to the side of the disk N² by a screw $n^7$. Projecting radially from the opposite side of the hub $n^2$ is an arm $n^8$ formed on its top with a triangular projection $n^9$ adapted to limit the rotative movement of the disk N² in relation to the member N' under the action of the spring $n^5$. Approximately one-half of the circumference of the disk $N^2$ is formed with ratchet-teeth $n^{11}$ while from its opposite side projects an integral, radial arm $n^{12}$. Driven into the end of the arm $n^{12}$ is a pin $n^{13}$ adapted to ride across the beveled end $l^{16}$ of the lever $l^8$ to rock the latter to free its pawl $l^9$ from the shoulder $n$ of the collar N.

*The connections between the ratchet-mechanism and the feed-shafts.*—The means above described act to oscillate the arm $n^8$ of the member N' as later explained, and an intermittent motion is transmitted therefrom to the feed-roll-shaft $a^4$ and feed-belt-shaft $b^3$ through the following described connections: Pivotally secured to the end of the arm $n^8$ of the member N' by means of the stud $n^{14}$, see Figs. 3 and 5, is a connecting-rod $N^4$ which extends horizontally along the side of the machine, as shown in Fig. 1, to transmit motion from the ratchet-mechanism above described to a second ratchet-device for driving the feed-roll A' and feed-belts $b$ shown in Fig. 2. Screwed into the side of the frame $A^2$, as shown at the left in Fig. 3, is a stud $a^7$ on which is journaled the gear $b^4$ which meshes with the gear $b^5$ on the end of the belt-pulley-shaft $b^3$. The gear $b^4$ also drives the pinion $a^6$ journaled on a stud $a^8$ and meshing with the gear $a^5$ on the feed-roll shaft $a^4$. Secured to the side of the gear $b^4$ is a ratchet-disk $a^9$ formed with peripheral teeth adapted to be engaged by a pawl $a^{10}$ pivotally mounted on an arm $a^{11}$. The arm $a^{11}$ is pivoted on the stud $a^7$ with its end connected to the connecting-rod $N^4$. A spring $a^{12}$ secured at one end to a pin $a^{13}$ in the side of the arm $a^{11}$ has its opposite end fastened to the end of the pawl $a^{10}$ to maintain the latter in engagement with the teeth of the ratchet $a^9$. As the arm $n^8$ is oscillated back and forth from the shaft L it acts through the arm $N^3$ and connecting-rod $N^4$ to actuate the arm $a^{11}$, and the latter, through its pawl $a^{10}$, turns the gear $b^4$ to rotate the feed-roll A' and belt-pulleys $b^2$ in the direction as indicated by the arrows 6 and 7, see Fig. 3.

*The detent-means for the ratchet-mechanism.*—Projecting from the side of the frame $K^2$ above the shaft L, see Fig. 3, is an arm $k^5$ to which is fastened a downwardly-extending bracket $k^6$. The lower end of the bracket $k^6$ terminates in a bearing $k^7$ formed with a lug $k^8$, see Fig. 7, through which is screwed a stud $k^9$ having its end located in position to be engaged by the end of the lever $l^8$ on the member L'. The stud $k^9$ is adjustable to regulate the action of the lever $l^8$ in causing its pawl $l^9$ to engage the shoulder $n$ of the collar N, to control the rotation of its connected member N' as later explained. Driven into a horizontal bore in the bearing $k^7$ on the bracket $k^6$ is a sleeve or bushing $k^{10}$ which projects some distance outwardly beyond the end of the bearing. Mounted free to turn on the projecting portion of the bushing $k^{10}$ is a rectangular block $o$ which has a flat sheet-metal pawl $o'$ fastened to its under side with its end $o^2$ projecting downwardly to adapt it to engage the teeth on the ratchet $N^2$. The opposite end $o^3$ of the pawl $o'$ projects rearwardly from the side of the block $o$ to adapt it to be engaged by a detent-pin $o^4$ driven into the side of a block $o^5$. Referring to Fig. 7, the block $o^5$ is positioned outwardly beyond the block $o$ and is mounted fast on a short shaft O which is free to turn in the bushing $k^{10}$. The block $o^5$ abuts the end of the bushing $k^{10}$ to hold the block $o$ in place thereon, while a collar $o^6$ at the opposite end of the shaft O abuts the end of the bearing $k^7$ to restrain the shaft from longitudinal movement therein. Preferably, the block $o^5$ is split on one side at $o^7$, see Fig. 3, to adapt it to be clamped to the shaft O and a binder-screw $o^8$ serves to secure it in position while also acting as a means for fastening to its side a flat pawl $o^9$. The pawl $o^9$ extends downwardly from the side of the block $o^5$ to adapt its end to contact with the detent-pin $n^{10}$ on the side of the disk $N^2$. With the parts in the position illustrated in Fig. 3, the engagement of the pawl $o^9$ with the pin $n^{10}$ holds the block $o^5$ with its pin $o^4$ bearing against the rearward end $o^3$ of the pawl $o'$. Through this engagement the block $o$ is tilted to maintain the opposite end $o^2$ of the pawl $o'$ raised free from the teeth $n^{11}$ on the ratchet $N^2$. The position of the block $o^5$ is normally controlled by a flat rod O' which extends across the machine to the sheet-operated tripping-mechanism P mounted on the sheet-separator-device F. Referring to Fig. 7, the forward end of the rod O' is inserted in a slot in the end of the shaft O and held in place by a pin $o^{10}$, see Fig. 7, while its rearward end is similarly connected to the tripping-mechanism as next described:

*The sheet-operated tripping-device.*—Referring to Figs. 8, 10 and 14, the sheet-controlled tripping-device for the pawl-and-ratchet mechanism just described is mounted on the frame F which supports the suction-lifter G and its connected elements. As shown more particularly in Figs. 10 and 11, the frame F is mounted directly on the main operating shaft L and held in position by two arms $f$ clamped to the transverse tie-rod $E^2$ by means of the binder-screws $f'$. Secured to a side-arm $f^2$ extending upwardly from the frame F is the flat paper-table or platen F', previously referred to as being set flush with the top of the feed-board B adjacent its forward end, see Fig. 2. Beneath the forward end of the table F' the arm $f^2$ is bored to receive a rotatable shaft P' which is positioned in axial alinement with the short shaft O mounted in the bearing $k^7$ at the opposite side of the machine. The shaft P' is slotted at $p$ throughout its entire length to adapt it to receive the flat rod O' which extends across the machine from the shaft O, and through this means the two shafts are connected to rotate together. At the same time, the slot $p$ allows the shaft P' to be slid along the rod O' when the frame F is adjusted to different positions in front of the feed-board B. The inner end of the shaft P' is formed with an enlarged head or collar $p'$, see Fig. 10, which seats in a counterbore $f^3$ on the side of the arm $f^2$, while on its opposite end is secured a collar $p^2$ seated in a counterbore $f^4$ to hold the shaft from longitudinal displacement. Referring to Fig. 14, a pin $p^3$ is driven into the under side of the collar $p^2$, to which is attached a spring $p^4$ anchored at its opposite end to a pin $p^5$ driven into the side of the arm $f^2$, see also Fig. 10. The spring $p^4$ tends to rotate the shaft P' and its connected shaft O in the direction indicated by the arrows 4, Figs. 3 and 14, but normally this movement is resisted by the action of a pawl $p^6$, the toe of which engages a shoulder $p^7$ on the head or collar $p'$. The pawl $p^6$ is pivoted on a pin $p^8$, driven into the side of the arm $f^2$, with its greatest portion pendant below the pin. Projecting from its side at its lower end is a pin $p^9$ on which is pivoted a pawl $p^{10}$ and also a separate block $p^{11}$. The rearward end of the pawl $p^{10}$ is beveled off at $p^{14}$, while its forward end is formed to engage the teeth of a ratchet-disk $P^2$ which is mounted fast on the operating-shaft L to turn therewith. Referring to Fig. 10, the ratchet $P^2$ is here shown as formed integral with a cam Q which serves as a reciprocating-means for the sliding crosshead on which the paper-separator devices are mounted as later described. The pawl $p^{10}$ is arranged to be held free from the ratchet $P^2$ by means of the tiltable block $p^{11}$ which has a pin $p^{12}$ projecting from its side and adapted to strike against the top of the pawl to raise the latter from the ratchet. The block $p^{11}$ is operated by a paper-tripped finger $P^3$ secured in a slot on its side and reaching up above the paper-separator table F'. The forward edge of the table F' is slotted at $f^5$, see Fig. 10, to receive the hooked end $p^{13}$ of the trip-finger $P^3$ when the latter is tipped back in the position shown in Fig. 8, through the normal action of gravity on the tilting block $p^{11}$.

*Method of operation of the paper-trip and ratchet-mechanism controlled thereby.*—In order that the functioning of these last described, correlated devices may be clearly understood, their method of operation will be explained before proceeding further with the general description of the other parts of the machine. Before the sheets of paper have been fed forward from the feed-board B onto the separator-table F' the trip-finger $P^3$ will be held in its rearward position, as shown in Fig. 8, by the weight of the pivoted block $p^{11}$. With the finger $P^3$ in this position the pin $p^{12}$ will bear on the rear end of the pawl $p^{10}$ to hold the lower end of the latter raised free from the teeth of the ratchet $P^2$. The pawl $p^6$ will then be held in engagement with the shoulder $p^7$ on the collar $p'$, through the weight of its lower pendant portion, see Fig. 14, and the shaft P' will thus be restrained from rotation under the action of the spring $p^4$. With the parts in this relation the flat rod O' connected to the shaft O, shown in Fig. 3, holds the block $o^5$ in the position here illustrated with its detent-pin $o^4$ bearing against the rear end $o^3$ of the pawl $o'$. The pawl $o'$ is thus held clear of the teeth on the ratchet-disk $N^2$ so that the latter is free to rotate with the member N' to which it is connected by the spring $n^5$. As before stated, the shaft L has a back and forth oscillating movement imparted to it from the crank-shaft I of the machine, and the flanged member L' is secured fast on the shaft to be oscillated therewith. Normally, the lever $l^8$ on the member L' will be held by the spring $l^{10}$ to maintain its pawl $l^9$ in position to engage the shoulder $n$ on the collar N, which latter is free on the shaft L but connected rotatively with the member N'. Hence, as the shaft L turns in the direction indicated by the arrow 5, Fig. 3, the member L' will act through the lever $l^8$ and its pawl $l^9$ to turn the collar N and member N' in the same direction so that the arm $n^8$ is oscillated through an arc of approximately one-half a revolution. During this movement the ratchet-disk $N^2$ will also be turned to the same extent with its pin $n^{10}$ maintained against the stop $n^9$ on the arm $n^8$ through the action of the spring $n^5$. Now, as the shaft L reverses its motion the pin $l^5$ on the side of the flange $l^3$ of the member L' strikes against the radial pin $n'$ on the collar N and the latter is thus turned back in the direction opposite to that indicated by the arrow 5, Fig. 3. It will be noted that when the pawl $l^9$ on the lever $l^8$ is carried into engagement with the shoulder $n$ on the collar N, the pin $l^5$ will be removed a slight distance from the pin $n'$ on the collar N. For this reason the member N' will not be carried to quite the full extent of the oscillation of the shaft L, but as the shaft oscillates through a little more than half a revolution and the movement of the member N' is practically the same, the arm $n^8$ has a throw of about 180 degrees in each direction. It has before been explained how the arm $n^8$ of the member N' transmits motion to the feed-roll A' to feed the paper down from the loading-board A to the feed-belts $b$ to carry the sheets forward on the board B.

It is to be understood that the functioning of the parts as above described takes place at the beginning of the operation of the machine before a bank of sheets has been fed down onto the feed-board B and also after each sheet is removed from the table F'. As soon as the first sheets have been fed forward to the front of the table F' the leading sheet X', shown in Fig. 14, acts to control the detent-mechanism for the pawl-and-ratchet devices of the feed-roll and belts in the following manner to prevent the feeding forward of additional sheets until the first one has been removed: As the leading sheet X' feeds to the end of the table F' its edge strikes against the trip-finger $P^3$ and rocks the latter to the right as shown in Fig. 14. This causes the block $p^{11}$ to be tilted to remove its pin $p^{12}$ from the rear end of the pawl $p^{10}$ and the latter then acts through gravity to drop into engagement with the teeth on the ratchet $P^2$. Now, as the ratchet $P^2$ is turned by its shaft L in the direction indicated by the arrow 5, Fig. 14, it will force the pawl $p^{10}$ bodily backward to rock the pawl $p^6$ to thereby release its toe from the shoulder $p^7$ on the collar $p'$. It will be noted from Fig. 14 that during this action the pin $p^{12}$ on the block $p^{11}$ will bear against the forward end of the pawl $p^{10}$ to restrain it from rising up out of engagement with the teeth of the ratchet $P^2$. Meanwhile, as the pawl $p^{10}$ is forced back by the ratchet $P^2$ its rearward, beveled end $p^{14}$ will strike against the periphery of the collar $p'$, so that after the pawl $p^6$ has been released from the shoulder $p^7$ the forward end of the pawl $p^{10}$ will be immediately raised and disengaged from the ratchet to prevent the continued rotation of the latter from causing further movement thereof. As soon as the pawl $p^6$ is released from the shoulder $p^7$ of the collar $p'$ the spring $p^4$ turns the shaft P' in the direction indicated by the arrow 4, Fig. 14, to operate the detent-mechanism for the pawl-and-ratchet devices on the shaft L as next explained:

Referring now to Fig. 3, as the shaft P' and rod O' are turned in the direction indicated by the arrow 4, through the action of the paper-trip-finger as just described, the shaft O will be rocked in the same direction. Meanwhile, the pin $n^{10}$ on the ratchet-disk $N^2$ will have been carried around away from the end of the pawl $o^9$ to allow the block $o^5$ to be tilted by the turning of the shaft O. The tilting of the block $o^5$ releases its pin $o^4$ from the rearward end $o^3$ of the pawl $o'$ and allows its forward end $o^2$ to drop from the effect of gravity until it engages a tooth on the ratchet $N^2$. Immediately this latter engagement is effected the ratchet $N^2$ will be held from rotation while the member L' continues to rotate carrying with it the lever $l^8$. The checking of the rotation of the ratchet $N^2$ causes the pin $n^{13}$ on its arm $n^{12}$ to rock the lever $l^8$ to release its pawl $l^9$ from the shoulder $n$ on the collar N. That is to say, as the member L' turns with the shaft L in the direction indicated by the arrow 5, Fig. 3, while the ratchet $N^2$ is held from movement, the beveled end $l^{16}$ of the lever $l^8$ will ride under the pin $n^{13}$ to rock the lever to carry its pawl outward beyond the shoulder $n$ on the collar N. This movement of the lever $l^8$ under action of the pin $n^{13}$ is sufficient to so straighten the bowed-spring $l^{10}$ that the latter will react to hold the lever $l^8$ against its stop-pin $l^{15}$ as shown by the dotted lines in Fig. 6. With the pawl $l^9$ thus held away from the collar N it is obvious that no movement will be imparted to the latter or to its connected member N' by the member L', and hence the arm $n^8$ will remain at rest and inoperative as regards the ratchet-mechanism for the feed-roll A' and feed-belt-pulleys $b^2$. It will therefore be seen that when a sheet of paper actuates the trip-finger $P^3$ the pawl-and-ratchet mechanism is thrown out of action so that the feeding-mechanism at the opposite end of the feed-board B ceases to feed forward more paper until the sheet X' is removed from the separator-table F'.

Upon the return stroke of the member L', that is when the shaft L is rocked back again in the direction opposite to that indicated by the arrow 5, Fig. 3, the parts are reset in operative relation as now described: The reverse movement of the member L' brings the rearward end of the lever $l^8$ against the end of the stud $k^9$ and this causes the lever to be rocked to carry its pawl $l^9$ into engagement with the periphery of the collar N again to adapt its end to engage the shoulder $n$ at the next opposite stroke of the member L'. It has been explained that the detent-pin $n^{10}$ must be moved away from the pawl $o^9$ before the block $o^5$ can tilt to release the pawl $o'$. This release of the pawl $o^9$ is effected through a slight, initial movement of the ratchet $N^2$ by its spring $n^5$ before the pawl $l^9$ on the lever $l^8$ is thrown out of action. That is to say, the lever $l^8$ acting through its pawl $l^9$ will have a slight effect to rotate the collar N, member N' and disk $N^2$ before the pawl is released from the shoulder $n$. This movement is almost negligible, however, and has substantially no effect on the pawl-and-ratchet mechanism at the farther end of the connecting-rod $N^4$. It will be seen that the first movement of the arm $n^8$ on the member $N^2$ will be downwardly so that the connecting-rod $N^3$ will not be carried to the right to any appreciable extent. In other words, the arm $n^8$ is on dead center at the beginning of its movement and consequently it must travel through a considerable arc before its motion becomes effective to oscillate the arm $a^{11}$ to turn the ratchet $a^9$. It will therefore be seen that if the pawl $o'$ is released immediately the pin $n^{10}$ moves away from the pawl $o^9$, then the rotation of the ratchet $N^2$ will be checked to cause the throwing out of the lever $l^8$ before its pawl $l^9$ can move the member $N^2$ to a sufficient extent to cause any effective action of its arm $n^8$ on the ratchet-arm $a^{11}$. It will be understood, of course, that in some cases the paper-tripped mechanism will not act until the ratchet $N^2$ and its connected parts have already actuated the ratchet arm $a^{11}$ to some extent. That is to say, after a sheet of paper has been removed from the table $F'$, and a second sheet is following it in close relation to its forward end, then the ratchet-mechanism will remain operative just long enough to feed the second sheet forward to actuate the trip-mechanism to arrest the ratchet $N^2$ in whatever position it may be. It is to be noted that the ratchet $N^2$ will always travel with the collar N when the latter is being turned by the pawl $l^9$ on the lever $l^8$, so that the pin $n^{13}$ on its arm $n^{12}$ is always in proper relation to act on the end of the lever $l^8$ when the movement of the ratchet $N^2$ is arrested. It will also be seen that the purpose of the spring connection between the ratchet $N^2$ and member $N'$ is to allow the latter and its collar N to rotate slightly beyond the ratchet when the latter is checked by the pawl $o'$.

It has already been mentioned that the pin $l^5$ on the member L strikes against the radial pin $n'$ on the collar N to turn the member $N'$ backward after it has completed its stroke in the direction indicated by the arrow 5, Fig. 3. This rearward movement of the member $N'$ acts through the projection $n^9$ on the arm $n^8$ and the pin $n^{10}$ on the disk $N^2$ to turn the latter back into place. The pin $n^{10}$ also serves to return the pawl $o'$ to its raised position by acting on the pawl $o^9$ to tilt the block $o^5$ and cause its pin $o^4$ to act on the rear end $o^3$ of the pawl $o'$. As the block $o^5$ is tilted back to its first position, as illustrated in Fig. 3, the shaft O will also be turned back in the direction opposite to that indicated by the arrow 4, see also Fig. 14, and through the rod $O'$ the shaft $P'$ will be turned back to cause it to be again held by the pawl $p^6$ engaging its shoulder $p^7$. The trip-finger $P^3$ will then be free to return to its position in the slot $f^5$ of the table $F'$, as shown in Fig. 8, ready to be acted upon by the next sheet of paper fed forward from the feed-board B.

*The sheet-separator in general.*—The most novel and important feature of my improved paper-feeding mechanism is the sheet-separating device for lifting the sheets one at a time, freeing them from those underneath, and then gripping them positively at their corners to feed them forward in succession. The separator-mechanism, as before indicated, comprises a suction-lifter and a positive paper-gripper which are mounted on the reciprocating crosshead $F^2$ arranged to move obliquely in relation to the side of the feed-board B. Referring to Figs. 8, 10 and 11, the frame F, previously referred to as being supported on the main operating-shaft L and the parallel cross-rod $E^2$, has its arm $f^2$ formed with a horizontal web $f^6$ provided with downwardly projecting bosses $f^7$. Secured to the bosses $f^7$ and set at an angle of approximately forty-five degrees to the sides of the frame F is a flat, horizontal guide-bar $F^3$ which serves as a track for the crosshead $F^2$ to slide on. Referring particularly to Figs. 10 and 11, the crosshead $F^2$ is made in the form of a substantially triangularly-shaped plate having on its top the oblique, slotted guideway $F^4$, grooved along its sides $f^8$ to embrace the sides of the track $F^3$. Projecting inwardly from the forward end of the guideway $F^4$ is a lug $f^9$ carrying a downwardly-projecting stud $f^{10}$ on which is journaled a roll $f^{11}$, see Fig. 10. The roll $f^{11}$ engages with a helical groove $q$ formed in the periphery of the cam Q previously mentioned as being mounted fast on the continuously oscillated shaft L. The form of the cam-groove $q$ is such that the back and forth oscillation of the shaft L will slide the crosshead $F^2$ first in one direction and then in the other along the track $F^3$ with a slight pause at the end of each movement. This halt of the crosshead at the ends of its stroke in either direction is caused by the roll $f^{11}$ riding in the straight portions of the cam-groove $q$ as the cam nears the end of each throw as later explained.

*The suction-lifter.*—Projecting from the outer corner of the cross-head $F^2$ is an arm $f^{12}$ formed with a downwardly-extending, vertical post $f^{13}$ on the top of which is mounted the swiveled suction-arm G, see Figs. 8 and 10. The arm G is formed at its rearward end with two downwardly-projecting ears $g$ hinged to turn on a cross-pin $g'$ driven through the flat-sided head $g^2$ of a stud $g^3$. The stud $g^3$ is mounted to turn in a bore $f^{14}$ in the vertical post $f^{13}$, see Fig. 8, and is held in place by a pin $f^{15}$ driven through the post with its side engaging a groove $g^4$ at the end of the stud. Referring to Figs. 8 and 10, a coiled spring $g^5$, secured to a pin $g^6$ in a lug $g^7$ on the arm G, is anchored at its opposite end to a pin $g^8$ on the crosshead $F^2$ and tends to swing the arm G inwardly toward the paper-table $F'$. A lug $f^{16}$ projecting from the top of the post $f^{13}$ is adapted to engage the flatted side of the head $g^2$ of the stud $g^3$ to limit the swinging movement of the arm G under the action of the spring $g^5$. Referring to Figs. 12 and 13, the arm G is made hollow or tubular throughout its length and at its outer end is formed with a cylindrical nozzle or shoe G'. The under side of the shoe G' is inclined at an angle to the arm G to adapt it to be set down flat on the top of the paper-table F' when the arm is swung into position over the table and then rocked downwardly thereagainst as later explained. As shown more particularly in Fig. 13 the bottom of the shoe G' is perforated with small holes $g^9$ through which a suction is exerted on the paper held beneath the shoe when the air is exhausted through the arm G. Fitted to an opening in the under side of the rear end of the arm G is a pipe-section or nipple $g^{10}$, see Fig. 12, to which is coupled the end of a flexible tube or hose $h$ connected at its opposite end to the suction-pump H to be later described.

On the under side of the arm G adjacent its hinge-ears $g$, see Figs. 8 and 10, is a cylindrical boss $g^{11}$ in the bottom of which is a rounded cavity adapted to receive the spherical end $r'$ of a rod $r$, see Fig. 8. The opposite end $r^2$ of the rod $r$ is also of spherical form to adapt it to fit a similarly shaped socket $r^3$ at the end of one arm of a lever R. The lever R straddles a bearing $f^{16}$ at the lower end of the vertical post $f^{13}$ on the crosshead F² and is pivoted on a pin $r^4$ extending therethrough. The lever R constitutes the operating-means for rocking the arm G through its toggle-like connection therewith by the rod $r$. A coiled spring $r^5$ hooked through a pin $r^6$ on the side of the arm G and anchored at its opposite end to a pin $r^7$ in the post $f^{13}$ acts to draw the arm downwardly to maintain the toggle connections in place.

The lever R is operated from a horizontal bar or slide S adapted to be reciprocated in grooved guideways $f^{17}$ on the outer side of the crosshead F². Referring to Fig. 8, the left-hand end of the slide S is formed with a vertical slot $s$ in which rides a roll $r^8$ journaled on a stud $r^9$ riveted through the upwardly-extending rear arm $r^{10}$ of the lever R, see also Fig. 10. The slide S is reciprocated in the direction indicated by the arrow 9, Fig. 8, to rock the lever R, through the engagement of a block $q'$ on the cam Q with its right-hand end as shown in Figs. 21 and 22, and explained more fully hereinafter. Projecting from the side of the slide S is a headed stud $s'$, see Fig. 8, flatted off on one side to adapt it to be engaged by the shoulder $s^2$ of a detent-arm S'. The detent-arm S' is pivoted on a stud $s^3$ screwed into the side of the crosshead F², and a flat spring $s^4$ secured to the top of the crosshead by the screw $s^5$ bears at its end on the top of the arm S' to carry it into engagement with the stud $s'$ on the slide S. In this manner the movement of the slide S in the direction opposite to that indicated by the arrow 9, Fig. 8, is limited when the arm G drops down to the position here shown. To allow the arm G to drop down onto the table F' after it has been carried into position above the latter, the detent-arm S' is raised free from the stud $s'$ through the instrumentality of means as next described:

Pivoted on a stud $s^6$ at the right-hand end of the slide S is a pawl $s^7$ having its major portion pendant below the slide. One side of the pawl $s^7$ is adapted to normally strike against a vertical shoulder $s^8$ on the rear face of the slide S, the shoulder being formed by cutting away the slide at its end, as shown in Fig. 10, to prevent the pawl from turning to the left. The pawl $s^7$ is free to swing in the opposite direction, however, and its under side $s^9$ is beveled upwardly and rearwardly as shown in Fig. 9 to adapt it to coöperate with the beveled end $q^2$ of the block $q'$ on the cam Q. The purpose of these beveled surfaces is to provide for an easier lifting of the detent-arm S' from the stud $s'$ as next explained: Referring to Figs. 20 to 22, when the cam Q is turning in the direction indicated by the arrow 5, the beveled end $q^2$ of the block $q'$ will ride under the beveled side $s^9$ of the pawl $s^7$ and forcing it against the shoulder $s^8$ will raise the detent-arm S' to release it from the stud $s'$ and allow the slide S to move to the right. Now, when the cam Q turns back in the reverse direction the block $q'$ will merely tilt the pawl $s^7$ to the right sufficiently to let it ride across the top of the block, the coöperation of these parts being described more in detail hereinafter.

*The positive paper-gripper.*—Arranged to coöperate with the suction-lifter G is a positively-acting paper-gripper T illustrated in detail in Figs. 8, 10 and 13. The paper-gripper T as here shown takes the form of a sheet-metal arm secured to a hub $t$ which is pivoted on a stud $t'$ screwed into a lug $g^{14}$ on the arm G, and positioned above and in axial alinement with the arm's pivot-stud $g^3$. The forward, free end of the arm T is bent down and around in a substantially U-shaped, spring jaw $t^2$, see Fig. 13, which is adapted to slide over the suction-shoe G' at the end of the arm G. The under side $t^3$ of the jaw $t^2$ is inclined downwardly to adapt it to conform to the lower, beveled contact-face of the shoe G' and when the jaw is slid across the shoe its top and bottom portions will have a wedging action to cause it to pinch against the shoe. Through this arrangement the jaw $t^2$ will bind the paper X' firmly against the bottom of the shoe G' to cause it to be seized positively at its edge as shown in Fig. 13. At its opposite end the arm T is formed with a downwardly bent, rearwardly projecting extension $t^4$ carrying a hub $t^5$ on its under side, see Figs. 8 and 10. Pivotally mounted in the hub $t^5$ is a stud $t^6$ held in place by a cotter-pin $t^7$ and formed at its top with a slotted head $t^8$. Pivoted in the slot of the head $t^8$ by means of a cross-pin $t^9$ is a pawl $t^{10}$ formed at its opposite, lower end with a downwardly-projecting detent-shoulder or toe $t^{11}$. The toe $t^{11}$ is adapted to hook over the curved edge $g^{13}$ of a plate $g^{12}$ secured to the top of the rear end of the arm G. The edge $g^{13}$ of the plate $g^{12}$ is formed concentric to the axis of the pivot stud $t^6$ to adapt the toe $t^{11}$ of the pawl $t^{10}$ to slide thereon as the arms G and T swing about the axis of the main pivot-stud $g^3$. Hinged to the top of the pawl $t^{10}$ by a pin $t^{12}$ is a bifurcated member $t^{13}$ through which extends a threaded rod $t^{14}$. The opposite end of the rod $t^{14}$ is swivelly connected to a fixed bearing on the paper-table F'. As shown most clearly in Fig. 8, the end of the rod $t^{14}$ is formed with an enlargement pivotally mounted on a cross-pin $t^{15}$ extending through the sides of the slotted head $t^{16}$ of a stud $t^{17}$. The stud $t^{17}$ is journaled in a vertical post $f^{17}$ reaching up from the corner of the table F' and is held in place by a cotter-pin $t^{18}$ at its lower end. Screwed onto the threaded rod $t^{14}$ on opposite sides of the member $t^{13}$ are two thumb-nuts $t^{19}$, $t^{20}$ adapted to be adjusted in position to strike against the member $t^{13}$ for a purpose as next explained: The function of the nuts $t^{19}$, $t^{20}$ is to act on the member $t^{13}$ to rock the pawl $t^{10}$ to engage its toe with the edge of the plate $g^{12}$ or to release it therefrom during the movement of the suction-arm G. The pin $g^6$ in the lug $g^7$ of the arm G extends upwardly therefrom and threaded through its end is a set-screw $t^{21}$, see Fig. 10, which serves as an adjustable stop for the arm T as it swings outwardly away from the arm G. A spring $t^{22}$ is anchored at one end to the upper end of the pin $g^6$ and its opposite end is hooked through a hole $t^{23}$ in the rearward extension $t^4$ of the arm T. The spring $t^{22}$ serves as the means for swinging the arm T, after the pawl $t^{10}$ is released, to carry the jaw $t^2$ into engagement with the suction-shoe G'. Through the means of the spring $t^{22}$, the rod $t^{14}$ and its nuts $t^{19}$, $t^{20}$, the gripper-arm T is actuated to coöperate with the suction-arm G as more fully explained hereinafter.

*Method of operation of the separator-device.*—The coördinate functioning of the suction-arm G and positive gripper T are indicated schematically in Figs. 17 to 19. While the sheet of paper X' is being fed forward on the table F', the crosshead F² remains for an instant at the outer end of its throw as the cam-roll $f^{11}$ rides in the straight portion of the groove $q$ of the cam Q, previous to and just after the reversal of movement of the operating shaft L, see Fig. 10. With the crosshead F² in this position the suction-arm G will be held with its shoe G' outward away from the side of the table F' and some distance removed from its forward end where the corner is cut away. With the arm G in this position the gripper-arm T will be swung forward free of the shoe G' with its rearward end held by the pawl $t^{10}$ engaging the edge $g^{13}$ of the plate $g^{12}$. Now, after the shaft L has made its reversal and commenced to rotate in the direction indicated by the arrow 5, Figs. 8, 9 and 10, the cam Q will slide the crosshead F² diagonally backward under the table F' as indicated by the arrow 11, Figs. 10 and 17, carrying the arms G and T with it while the latter remain in the same relative positions as just described. As the crosshead F² starts to move in this direction the arm G is swung around slightly by its spring $g^5$ until the flatted head $g^2$ of the stud $g^3$ strikes against the limiting lug $f^{16}$. Then as the cam-roll $f^{11}$ reaches the opposite end of the groove $q$, the suction-shoe G' will be brought into position above the forward projecting end of the table F' so that approximately one-half of the bottom face of the shoe will be directly superimposed above the side edge of the sheet X' near its forward end, see Fig. 18. At this point the crosshead F² halts for an instant while the cam Q is reversing and the devices for forcing the shoe G' down into contact with the paper then come into play as next described:

As the cam Q rotates in the direction indicated by the arrow 5, Fig. 8, the block $q'$ on its end will be brought around under the lower, beveled edge $s^9$ of the pawl $s^7$ to gradually wedge the detent-arm S' upwardly as before described, see Fig. 20. At the instant when the roll $f^{11}$ is brought to the end of the angular portion of the cam-groove $q$ and the crosshead F² has reached the rearward limit of its traverse, the detent-arm S' will have been raised sufficiently to clear its shoulder $s^2$ from the pin $s'$ on the sliding-bar S. Immediately this release takes place the bar S is free to slide to the right, as viewed in Fig. 8, and the spring $r^5$ will act on the suction-arm G to rock it on its hinged-bearing $g^2$ to bring the suction-shoe G' down onto the top of the sheet X' which has been fed forward across the table F'. The force of the spring $r^5$ is augmented by the weight of the arm G and the parts carried thereby so that the suction-shoe G' is brought down against the sheet of paper X' with a quick, sharp action similar to the manner of striking a smart blow with a hammer. At this juncture the mechanism of the air-pump H comes into action as later described to cause a vacuum in the arm G to exert a suction on the sheet of paper under the shoe G'. As the arm G is rocked downwardly as above described it will act through its toggle connection $r$ to rock the lever R to slide the bar S to the right, see Fig. 21, until the end of the latter comes into contact with the end of the block $q'$ on the cam Q. The rotation of the cam Q is so timed that this last engagement will not take place until the suction-shoe G' is firmly seated against the top of the sheet X' as before explained and the air has been exhausted from the arm G. These last named operations are practically instantaneous so that the shoe G' may be said to suck at the paper immediately it comes into contact therewith. Now, as the block $q'$ on the cam Q meets the end of the bar or slide S the latter will be pushed back in the direction indicated by the arrow 9, Fig. 8, by the continued rotation of the cam. This rearward movement of the slide S acts through the roll $r^8$ engaging its slot $s$ to tilt the lever R back to its original position as shown in Fig. 22, and as the lower arm of the lever is rocked upwardly it operates through the rod $r$ to lift the arm G. Meanwhile, the sheet of paper under the shoe G' will have been acted upon by the suction through the holes $g^9$ in the bottom of the shoe to hold its corner fast against the shoe so that it will be raised therewith, see dash lines in Fig. 22. The movement of the slide S under the action of the block $q'$ on the cam Q is slightly greater than what is required to raise the arm G to its first, fixed position so that the raising of the arm is continued for a purpose as later described. Before the arm G reaches the end of its upward throw, however, the positive paper-gripper comes into action as next explained:

As the arm G is tilted or rocked back on its hinges $g$ the pawl $t^{10}$ pivoted on the stud $t^8$ will have the same motion about the axis of the arm. This will cause the member $t^{13}$ to slide back on the rod $t^{14}$ which is held fixedly at its rearward end in its bearing on the table F'. As the member $t^{13}$ slides back on the rod $t^{14}$ it will come into contact with the adjustable thumb-nut $t^{19}$ to prevent its further movement, and this will have the effect of lifting the pawl $t^{10}$ on its own axis to release its toe $t^{11}$ from the edge $g^{13}$ of the plate $g^{12}$. Immediately this release is effected the spring $t^{22}$ will act to swing the arm T on its pivot $t'$ to carry its jaw-member $t^3$ around under the suction-shoe G'. As the jaw $t^2$ slides into engagement with the shoe G' its lower side $t^3$ slides in under the edge of the paper X' to grip the corner of the sheet positively against the shoe G' as previously explained. The vacuum in the shoe G' is now relieved and the sheet of paper will be held firmly by its corner to be moved forward by the arm G. The last part of the upward movement of the arm G takes place as the motion of the cam Q is being reversed and the arm is then brought back to its first position illustrated in Fig. 8 as the block $q'$ turns back. This last action of the block $q'$ on the slide S causes a quick motion to be transmitted to the end of the arm G to jerk the paper up and down in the manner of shaking an object held between the fingers. This shaking of the sheet acts to cause a wave of air to pass beneath it to assist in freeing it from the next sheet underneath. These motions of the arms G and T will be more fully referred to hereinafter in relation to the method of operation of the complete apparatus.

As the slide S is moved in the direction indicated by the screw 9, Fig. 8, the stud $s'$ passes back under the shoulder $s^2$ on the detent-arm S' and allows the latter to drop down into place as shown in Fig. 22. Now, as the slide is carried back in the opposite direction by the dropping of the arm G the pin $s'$ will meet the shoulder $s^2$ and prevent further movement of the slide to hold the arm G in its original position as illustrated in Fig. 8. As the cam Q turns back its block $q'$ will ride under the pawl $s^7$ and tilt the latter out of the way until the block has passed, when the pawl will return to its initial position through gravity to be again acted upon to raise the arm S' during the next cycle of operations. Meanwhile, as the shaft L turns back in the direction opposite to that indicated by the arrow 5, Fig. 8, the cam Q will cause the crosshead $F^2$ to be drawn obliquely forward again to its first position shown in Fig. 10. The sheet of paper held by its corner at the end of the arm G will thus be drawn diagonally forward as more fully explained hereinafter. Before the crosshead $F^2$ reaches its forward extreme of travel the member $t^{13}$ on the pawl $t^{10}$ comes into engagement with the thumb-nut $t^{20}$ on the end of the anchored rod $t^{14}$ and this acts through the pawl to exert a pull on the rear end of the arm T. As the movement of the crosshead continues, this pulling action through the rod $t^{14}$ serves to swing the arm T around on its pivot $t'$ to free its jaw $t^3$ from the shoe G' and thus release the paper. This action takes place after the paper has been fed to the edge-grippers C' as later described. The movement of the arm T is continued until its edge strikes against the limit screw $t^{21}$ and the pull of the rod $t^{14}$ will then act to swing the arm G against the action of its spring $g^5$ until finally the shoe G' is carried clear of the edge of the sheet of paper upon which it has just been operating.

*The suction air-pump.*—The vacuum-device for effecting the suction action of the shoe G' on a sheet of paper held beneath it is illustrated in Fig. 15 and will be next described: The pump-cylinder H is mounted on the frame K located at the farther side of the feed-board B adjacent the separator-device F as before explained. Arranged to slide in the cylinder H is a piston H' of usual type carrying a contact ring $h^2$ and having its operating rod $h^3$ projecting down through a bore in the head $h^4$. Fastened to the top of the piston H' is a coiled spring $h^5$ which is compressed against the top of the cylinder H when the piston is raised to its upper position therein as shown in Fig. 15. The piston H' is raised in the cylinder H by means of the rack-bar J which strikes against the lower end of the rod $h^3$ when the bar is moved upwardly from the rotation of the crank-shaft I shown in Fig. 1 and previously described. After the piston H' has been raised to the end of its stroke it is held at the top of the cylinder H by a detent-arm U formed with a shoulder $u$ which is adapted to engage the lower end of the rod $h^3$ as the rack J starts to descend. The arm U is pivoted on a stud $u'$ screwed into a boss on the frame K and is held at the top by an offset clamp-piece $u^2$ under which it slides. The clamp $u^2$ also serves to limit the movement of the arm U to the right as later explained. Pivoted on a screw $u^3$ in the arm U is a release-pawl U' formed with a shouldered end $u^4$ overlapping the side of the rack J and adapted to be engaged by a pin $u^5$ at the top of the rack. Fastened to a pin $u^6$ on the pawl U' is a spring $u^7$ having its opposite end anchored to a pin $u^8$ driven into the side of the frame K. The spring $u^8$ acts on the pawl U' to tilt its shouldered end $u^4$ upwardly and a pin $u^9$ in its rear side strikes against the edge of the arm U to limit the movement of the pawl in this direction. The function of the spring $u^7$ is twofold; first, to tilt the pawl U'; and second, to rock the arm U to the left to engage its shoulder $u$ with the end of the piston-rod $h^3$. It will be noted that the arm U is beveled off at its upper end and this bevel $u^{10}$ strikes against the side of the rod $h^3$ to allow only a slight engagement between the shoulder $u$ and the end of the rod.

The cylinder H is formed on one side with an air-duct $H^2$ which communicates with the interior of the cylinder through a port $h^6$ at the top. A relief-port $h^7$, shown by dotted lines in Fig. 15, opens to the atmosphere from the bottom of the cylinder to relieve the pressure therein as the piston descends. Communicating with the bottom of the air-duct $H^2$ is a pipe-nipple $h^8$ to which is attached the end of the tube or hose $h$ leading to the suction-arm G. Opening into the side of the air-duct $H^2$ is an exhaust-port $h^9$ which is normally closed by a valve V. The valve V is mounted on a lever V' hinged by a pin $v$ to a lug $h^{10}$ projecting from the side of the cylinder H. Hooked through the lever V' at its upper end is a rod $v'$ the lower end of which slides in a block $v^2$ pivoted on the outer end of the pawl U' by means of a pin $v^3$. Fastened to the lower end of the rod $v'$ is a spring $v^4$ anchored to the frame K at $v^5$. Adjustably mounted on the rod $v'$ is a split collar $v^6$ clamped in place by a binder-screw $v^7$. The operation of this part of the apparatus is as next explained:

*Method of operation of the suction-device.*—As the rack-bar J is raised through the action of the crank or eccentric on the shaft I it comes into contact with the end of the rod $h^3$ and slides the piston H' to the top of the cylinder H. During this upward movement of the piston the valve V will be forced open against the action of the spring $v^4$ on the rod $v'$ to relieve the compression in the cylinder H and duct $H^2$. Meanwhile the spring $h^5$ on the top of the piston H' is compressed against the top of the cylinder and as soon as the rack J starts downwardly the detent-arm U will be rocked into engagement with the end of the piston-rod $h^3$ to hold the piston raised. The rack J will therefore slide downwardly without the piston until its pin $u^5$ strikes against the shouldered end $u^4$ of the pawl U'. As the pin $u^5$ engages the shoulder $u^4$ at an angle, it will act with a wedging effect to force the pawl U' bodily to the right and in this manner the detent-arm U will be pried out from under the end of the piston-rod $h^3$. As soon as the detent-arm U is released from the rod $h^3$ the compression-spring $h^5$ will initiate a downward movement of the piston H' in the cylinder H which will be continued by the action of gravity while the air below the piston exhausts through the relief-port $h^7$. Meanwhile, the exhaust-valve V will be held closed by the spring $v^4$ acting through the rod $v'$ and hence a vacuum will be created in the top of the cylinder H and the air duct $H^2$. This causes a suction through the tube $h$ and arm G whereby the paper will be sucked against the shoe G' in the manner and for the purpose as hereinbefore explained.

Now, as the rack-bar J still further continues its downward movement the arm U brings up against the offset in the clamp $u^2$ to limit its movement in this direction and the pawl U' will then be rocked on its pivot $u^3$. This rocking of the pawl U' slides the block $v^2$ upwardly along the rod $v'$ until it strikes against the collar $v^6$. The engagement between the block $v^2$ and collar $v^6$ now acts to raise the rod $v'$ to lift the lever V' and release the valve V from its seat, so that air will be admitted through the port $h^9$ to relieve the vacuum in the cylinder H. It will be understood that the collar $v^6$ is adjusted on the rod $v'$ to provide for the opening of the valve V at the proper interval after the paper has been raised by the suction-arm G and seized positively by the gripper T. As the rack-bar J ascends in its next stroke the pin $u^5$ will be carried away from the end of the pawl U' so that the latter will be tilted back again by its spring $u^7$ to allow the spring $v^4$ to again close the valve V. The various parts of the apparatus will then function again in the manner as above described.

*The revolving edge-grippers.*—As the sheet of paper is fed forward from the table F' by the separator-device G, it is delivered to the revolving edge-grippers C' carried by the disks $c$ on the shaft C. These are arranged in series across the machine adjacent the delivery-belt-pulleys D which carry the sheets onto the top of the delivery-board D', see Fig. 2. For an understanding of the coöperation of the edge-grippers with the apparatus of the present invention a brief explanation of their functioning will now be given: Referring to Figs. 3 and 4, the edge-grippers C' are mounted on cross-shafts $c'$ which extend through bearings near the peripheries of the several disks $c$, see Fig. 2, and are arranged to pivot on the sides of the latter. There are two sets of grippers mounted diametrically opposite each other on the disks $c$, as shown in Fig. 16, but it will be sufficient for the purpose intended to describe one set only. Each gripper consists essentially of a rockable anvil $c^2$ and a pivoted clamp-member $c^3$, the latter having a curved spring-finger $c^4$ adapted to be set down against the top-face $c^5$ of the anvil to grip the paper therebetween. The clamp-member $c^3$ is fast on the cross-shaft $c'$ to be turned thereby while the anvil $c^2$ is free to turn on the shaft when operated by a bowed spring $c^6$. The spring $c^6$ is held at one end in a slot $c^7$ of a pin $c^8$ swiveled in the anvil $c^2$, while its opposite end engages a groove $c^9$ in the side of a pin $c^{10}$ which projects from the side of the disk $c$. The rear end of the anvil $c^2$ is formed with a tail-piece $c^{11}$ adapted to strike against a pin $c^{12}$ also projecting from the side of the disk $c$. The tendency of the spring $c^6$ is normally to maintain the anvil $c^2$ in the position illustrated in Fig. 3 with its tail $c^{11}$ bearing against the pin $c^{12}$. At its outer end the anvil $c^2$ carries a stud $c^{13}$ on which is journaled a roll $c^{14}$. The roll $c^{14}$ is adapted to ride on a cam-face $d'$ which is formed on the under side of a bracket or arm $d^2$. The arm $d^2$ is mounted adjacent the edge of the delivery-board D', see Fig. 2, with its top flush with the upper face thereof. It will be noted that there is an arm $d^2$ for each gripper-device C' and together they constitute a series of overhanging brackets for the delivery-board D' so arranged as to receive the leading edges of the sheets of paper carried upwardly thereto by the grippers C'.

*Method of operation of the revolving edge-grippers.*—The gripper-shaft C and disks $c$ are rotated intermittently from the shaft L, as previously described, in the direction indicated by the arrow 10, Fig. 3. As the grippers C' revolve upwardly toward the sheet of paper being carried forward in the grip of the separator-arms G and T the clamp $c^3$ is maintained with its spring-finger $c^4$ raised above the top of the anvil $c^2$ as shown in Fig. 3. As soon, however, as the edge of the paper has been inserted between the finger $c^4$ and the anvil $c^2$ the clamp $c^3$ is rocked by the shaft $c'$, through the operation of mechanism not herein shown or described, to the position shown in Fig. 4. Through this operation the sheet X' is securely gripped along its forward edge by all of the grippers of the series and at this point the arms G and T release the sheet in the manner as before described. The sheet X' will now be fed forward solely by the grippers C' and as the disks C continue to turn a further rotation is imparted to the shaft $c'$ which causes the clamp $c^3$ to turn the anvil $c^2$ against the action of the spring $c^6$ with the clamp $c^3$ turning with it. It will be noted that the upper face $c^5$ of the anvil $c^2$ is curved to conform to the arc of the gripper-finger $c^4$ and as these two parts are rocked around the axis of the shaft $c'$ they finally reach a position where their curved portions are concentric with the shaft C. In other words, the top of the anvil $c^2$ and the curved face of the finger $c^4$ will be brought into alinement with the periphery of the disk $c$ as shown in Fig. 4. At this point the edge of the sheet X' will be brought up to the forward ends of the brackets $d^2$ to meet the curved upper faces thereof to slide the sheet over the tops of the brackets. At this juncture the roll $c^{14}$ will come into engagement with the cam-face $d'$ on the under side of the bracket $d^2$ and riding around thereon will cause the anvil $c^2$ to be held while the clamp $c^3$ is tilted back by the rocking of the shaft $c'$ to release the paper from its grip. At this point the sheet X' will have been brought well forward onto the delivery belts $d$ which are being traveled by the pulleys D, and under the rider-rolls E', see Fig. 16, so that they will be carried forward by the belts onto the delivery-board D'.

*Method of operation of the complete apparatus.*—A brief recapitulation of the method of operation of each mechanism of the machine will now be given in order to explain the coördinate functioning of the whole apparatus. Referring to Fig. 1, the operator first places a stack or pile of sheets X on the inclined loading-table or supply-board A cap with their side edges brought into alinement against the loader gage $a$, and with their forward edges combed out in feathered relation. The combing out of the sheets is effected by doubling or rolling the pile over on itself until the edges spread out fanwise like the leaves of an open book. The object of this is to provide for feeding the underneath sheets first and to regulate the number of sheets passing around the feed-roll $A'$ down onto the board B. Assuming that the crank-shaft I has been set to rotating, the rack-bar J will be reciprocated therefrom, through the connecting-rod $i$, and will impart a back-and-forth oscillating motion to the gear $l$ and main driving-shaft L, see Fig. 15. There being no sheets on the paper table $F'$ the trip-finger $P^3$ will be maintained by the weight of the block $p^{11}$ with its upper end in the recess $f^5$ at the edge of the table, as shown in Figs. 8 and 10, and the pawl $p^{10}$ will therefore be held raised from the teeth of the ratchet $P^2$, see Fig. 14. The rock-shaft $P'$ will be locked from rotation by its pawl $P^6$, as shown in Fig. 14, and hence the connected rock-shaft $O'$ at the opposite side of the machine will be held in the position shown in Fig. 3 to maintain the block $o^5$ with its pin $o^4$ engaged with the end $o^3$ of the pawl $o'$. In this way the pawl $o'$ is held clear of the teeth on the ratchet-disk $N^2$ to allow a free rotation of the latter. With the parts in this relation the oscillation of the member $L'$ by and with the shaft L transmits a substantially equal movement through the lever $l^8$ and pawl $l^9$ to rock the collar N and its attached member $N'$ in the direction indicated by the arrow 5, Fig. 3, while the pins $n'$ and $l^5$ coöperate to rock the members N, $N'$ in the opposite direction when the shaft L reverses. In this manner the arm $n^8$ on the member $N^2$ is oscillated back and forth through an arc of approximately 180 degrees to transmit a similar rocking motion through the connections $N^3$, $N^4$ to the ratchet-arm $a^{11}$. The arm $a^{11}$ will therefore actuate the pawl $a^{10}$ to turn the ratchet $a^9$ and gear $b^4$ with a forward, step-by-step motion which is transmitted to the gears $b^5$ and $a^6$. The gear $b^5$ drives the shaft $b^3$ carrying the pulleys $b^2$ around which the belts $b$ pass, see Fig. 2, so that the latter will be given an intermittent, forward, traversing motion across the top of the feed-board B. Referring back to Fig. 3, the gear $a^6$ drives the gear $a^5$ on the shaft $a^4$ to turn the feed-roll $A'$ in the direction indicated by the arrow 6, see also Fig. 1, and the belts $a'$ which pass around the roll are thereby traversed across the top of the supply-board A in a direction opposite to that of the belts $b$ as indicated by the arrows 12 and 13, Fig. 1.

As the belts $a'$ move in this direction they gradually draw the stack of sheets X toward the roll $A'$ to feed their edges in under the flaring end of the cowl or guard $A^3$. The guard $A^3$ is adapted to allow the passage of a limited number of sheets down around the roll $A'$ and onto the board B, and it is to be noted that the under sheet of the stack on the board $A'$ feeds ahead of the others and becomes the top sheet $X'$ of the bank on the lower board B. In this way the sheets are fed forward in overlapped relation to the paper-table $F'$ to be operated upon one at a time by the separator-device G.

As soon as the leading sheet $X'$ feeds forward into position on the table $F'$ it acts to trip the pawl-and-ratchet mechanism to prevent further operation of the feed-roll $A'$ and belts $a'$, $b$, as before described. Referring to Fig. 14, the engagement of the edge of the sheet $X'$ with the trip-finger $P^3$ rocks the block $p^{11}$ to allow the pawl $p^{10}$ to fall into engagement with the teeth on the ratchet $P^2$, and as the latter turns with its shaft in the direction indicated by the arrow 5, Figs. 8 and 14, it will move the pawl $p^{10}$ to pry the pawl $p^6$ free from the shouldered collar $p'$ on the shaft $P'$. The shaft $P'$ will thereupon be rocked by its spring $p^4$ to rock the shaft O at the opposite end of the rod $O'$, and the block $o^5$ will thereby be turned to release its pin $o^4$ from the pawl $o'$. This release allows the pawl $o'$ to drop into engagement with the teeth on the ratchet $N^2$ to arrest the rotation of the latter and cause the pin $n^{13}$ in the end of its arms $n^{12}$ to rock the lever $l^8$ to release the pawl $l^9$ from the shoulder $n$ on the collar N. The collar N and its connected member $N'$ will therefore cease to be driven from the member $L'$ and hence the arm $n^8$ will be rendered inactive as regards its connection with the ratchet-mechanism which turns the gear $b^4$. The gear $b^4$ will therefore remain at rest and the shafts $a^4$ and $b^3$ will also be halted so that no further movement is transmitted to the feed-roll $A'$ and belts $a'$ and $b$. In this manner the feeding mechanism is regulated so that normally only one sheet at a time is fed forward to the front end of the paper-table $F'$ and this sheet must be removed before another one is carried into position. Should two or more sheets be fed onto the table $F'$ with their leading edges in alinement they would be operated upon in succession by the separator-device, but no more sheets could be fed into place until the last one had been lifted and carried forward from the table $F'$. The object of this arrangement is to keep the sheets in staggered relation to prevent them from piling up on the table $F'$ faster than the separator-mechanism can handle them. It will be understood therefore that normally the sheets feed forward to the front end of the separator-table F' to bring only one sheet at a time under the separator-device G which operates thereon as follows:

While the sheets are being fed forward to bring the leading one into position on the table F' the rotation of the shaft L in the direction indicated by the arrow 5, Figs. 3 and 10, will also act to slide the crosshead F² rearwardly on its track F³ as before explained. As the crosshead F² starts to move back the spring $g^5$ on the arm G acts to swing the latter back until the head $g^2$ of the stud $g^3$ strikes against the stop-lug $f^{16}$ on the crosshead. Now, as the shaft L approaches the limit of its movement in this direction the cam Q brings the crosshead F² to the end of its stroke with the arm G raised above the table F' and the shoe G' poised over the corner of the sheet X' as shown in Fig. 18. At this point the feed-roll A' and belts $a'$, $b$ will cease their movement and the sheets X will come to rest while the arm G is brought into operation to raise the leading sheet X' by its corner. This operation of the arm G on the sheet X' is as follows: First, the detent-arm S' is raised by the action of the block $q'$ rotating with the cam Q, see Fig. 20, and the slide S is thus released to allow the arm G to be drawn down by its spring $r^5$, see Fig. 8. This causes the suction-shoe G' to be pressed firmly down against the sheet X' at a point near the forward end of the table F' and immediately the suction-pump comes into action, as before explained, to exhaust the air through the arm G. This creates a suction through the perforations in the bottom of the shoe G' and the sheet X' will be sucked thereagainst to lift its corner as the arm G is raised. The raising of the arm G is caused by the sliding of the bar S through the engagement of the block $q'$ with its right-hand end as shown in Fig. 22. This rocks the lever R which acts on the arm G through the rod $r$ and the corner of the sheet X' is lifted as illustrated by the dash lines in Fig. 22. After the arm G has been raised to the full extent of its throw it is whipped quickly downward again, as the cam-block $q'$ reverses its motion, to bring the arm back to its normal position where it is held through the locking of the slide S by its detent-arm S'. The quick, jerking action of the arm G on the corner of the paper resembles the manner of spreading a cloth on a table, or a sheet on a bed, and serves to cause a current or air to pass under the paper to free it from the sheets underneath. Usually, there is considerable static electricity in the sheets of paper lying on each other in the pile, due to their proximity to the belts and other moving parts of the machine, and this has a tendency to cause the sheets to cling together. It has been demonstrated that the shaking of the sheets by their corners in the manner described above is sufficient in most instances to overcome this clinging tendency of the paper and to entirely free the top sheet from those underneath. In some cases, however, where very thin paper is being operated upon, the adherence of the sheets is greater and a forced draft of air from the pump H is directed under the upper sheet. This may be effected by the employment of an air nozzle, not here shown, appropriately placed adjacent the raised corner of the top sheet and connected by a hose to the exhaust port $h^7$ of the pump cylinder H to provide for forcing a blast of air through the nozzle as the piston H' descends.

After the sheet X' has been grasped positively between the shoe G' and the gripper T and the arm G has returned to its normal position, as shown in Figs. 8 and 19, the crosshead F² starts to slide back under the impulse of the cam Q turning in the direction opposite to that indicated by the arrow 5, Fig. 10. The crosshead F² now moves in the direction opposite to that indicated by the arrow 11, Fig. 10, and obliquely in relation to the side of the separator-table F' and the sheet of paper X' being operated upon. It will therefore be seen that the gripper-arms G and T, which now remain at rest on the crosshead F² while being carried outwardly with it, will exert a diagonal pull on the sheet X' to carry it forward at an angle of forty-five degrees. The sheet X' will thus be drawn off to one side of the feed-table F' and forwardly therefrom as represented by the dash lines in Fig. 17, but it is to be noted that the edges of the paper remain square with the sides of the table. That is to say, the sheet will not be swung around or carried askew, but on the contrary its front edge will move forward in parallel relation to the gripper-shaft C so as to meet all of the edge-grippers C' of the series as they revolve around into alinement therewith. As the sheet X' is pulled forward in this manner its front edge is drawn into position above the anvils $c^2$ of the several grippers C' and immediately the clamps $c^3$ are rocked into the position shown in Fig. 4 to bring the spring-fingers $c^4$ down thereagainst to grip the paper as previously explained. As soon as the paper has thus been seized by the edge-grippers C' its corner is released from the grip of the arms G and T. This is effected as follows:

As the crosshead F² approaches the outer extreme of its travel, the member $t^{13}$ sliding on the anchored rod $t^{14}$, see Figs. 8 and 10, comes into engagement with the thumb-nut $t^{20}$ at the outer end of the rod. This causes the arm T to be swung around on its pivot $t'$ while the crosshead F² is continuing to the end of its travel. The first part of this swinging movement immediately frees the paper from the grip of the jaw $t^2$ and the arm T still continues to move around until its side comes into contact with the limit screw $t^{21}$ on the arm G. At this juncture the pawl $t^{10}$ will have been carried into position with its toe $t^{11}$ engaging the edge of the plate $g^{12}$ to lock the arm T in fixed relation with the arm G and the two arms will then be moved together on their common pivots $g^3$. In other words, the pull of the rod $t^{14}$ now acts through the arm T which bears against the stop-screw $t^{21}$ to swing the arm G clear of the side of the table F' as shown in Fig. 10. It will be noted from the dash lines in Fig. 17 that the sheet X' is drawn sidewise by the arm G to such an extent that finally its outer edge comes substantially flush with the edge of the table F'. For this reason it will be seen that the last movement of the arm G, as the crosshead reaches the end of its outer travel, will bring the suction-shoe G' clear of the side edge of the sheet X' so as not to obstruct the movement of the latter as it draws forward across the table F'. This withdrawal of the arm G away from the side of the sheet X' provides for its insertion in under the edge of the sheet, after the latter has been raised by the edge-grippers C', to bring the suction-shoe G' into position to act on the next sheet of the bank as later explained.

As soon as the sheet X' has been drawn forward to the revolving grippers C' and its edge grasped thereby, it is drawn upwardly onto the delivery-belts $d$ and held under the rider-rolls E' to feed it across the board D'. The gripper-shaft C is operated intermittently, as before described, and as the front edge of the sheet X' feeds along on top of the arms $d^2$, see Fig. 2, it is released from the grippers C' which continue to rotate to pick up the next alternate sheet fed thereto. Meanwhile the other set of grippers C' positioned diametrically opposite on the disks $c$ will first be brought into action on the next sheet as later explained.

It has been mentioned that the crosshead $F^2$ halts for an instant at either end of its travel, but the pause is only for a brief period, hardly perceptible, in fact, before the parts are again in motion. Therefore, as soon as one sheet X' has been fed forward to the edge-grippers C' and its front end raised thereby, the arm G, after being carried out beyond the edge of the sheet, is immediately moved back again into position under this sheet and above the next sheet brought into place on the table F'. In other words, the arm G will be withdrawn from above one sheet and then immediately inserted thereunder to adapt it to act on the next sheet of the bank in the same manner as first described. In this way a continuous succession of sheets is maintained feeding to the two sets of edge-grippers revolved by the shaft C, so that the paper will be fed onto the delivery-belts $d$ with their leading edges only a slight distance apart. As the delivery-belts $d$ are traversed forward by the intermittent rotation of their pulleys D on the shaft C, the sheets are shifted along step-by-step on the board D' to bring them successively into position to be taken therefrom by the sheet-delivery device of the printing press or other machine. It will be noted that the paper feeds onto the board D' with the leading sheet always on top and each succeeding sheet following underneath, so that the forward sheet is invariably in position to be lifted or slid off from the others without hindrance therefrom. Usually a side-registering device is employed in connection with the delivery-board D' to maintain the sheets in proper alinement, but this is not here shown or described as it forms no part of the present invention.

*Novel features and advantages of the machine.*—As before indicated the most important and novel features of my new device reside in the separator-device. It has been explained that this acts in a distinctly new manner to raise the corner of the sheet through suction and to then grip it positively. This action is very similar to the human operation of the hand in counting bills or turning the pages of a book. The suction-arm G and gripper-member T correspond to the forefinger and thumb of the hand and are manipulated in much the same manner with a sort of wrist motion. First, the suction-member is pressed down on the top of the sheet, as a person's moistened finger would be, and as it is raised and turned outwardly the member T is slid underneath the corner to pinch the paper between the two members exactly as the hand would pick it up. The arm G is next operated to shake the paper free from the sheets underneath in very much the same way as a cloth or sheet is manipulated to spread it out free from contact with an object on which it rests.

A further, most important feature of the separator-device consists in the manner of drawing the sheets obliquely forward by one corner only. It has been determined that this method of pulling the sheets across those underneath is much easier than to attempt to draw them forward with a straight-line movement while grasping them at both forward corners. Less resistance is offered to the pull of the sheets on the diagonal and they will have less tendency to adhere together. It has also been found that the sheets can be maintained in closer alinement in this way, that is with their front edges in more perfect parallelism so as to insure a more uniform engagement thereof by the edge-grippers.

The method of operating upon the underneath sheet before the top sheet is fed clear therefrom is also believed to be novel and through this arrangement a much more rapid delivery of the sheets is secured. That is to say, a plurality of sheets are constantly being fed forward at the same time so that a continuous supply is maintained on the delivery-board. Heretofore it has been the usual practice to carry the top sheet away from the bank before the next sheet is operated upon and it is obvious that this method limits the speed of delivery of the sheets. Furthermore, as the leading sheet is maintained always on top of the following sheets which are fed underneath it, the sheets are brought into position to be lifted free of the delivery-board one at a time in rapid succession.

In addition to these features there is the novel arrangement of mechanism for regulating the feeding of the sheets in stepped relation to the separator-device and the means for arresting the feed to prevent the accumulation of too many sheets in juxtaposition therewith. These and various other improvements as before pointed out all provide for a more accurate, positive and dependable manipulation of the sheets to secure a regular, continuous delivery thereof at maximum speed, with the operation of the machine entirely automatic in all of its movements.

Various modifications might be made in the structure and arrangement of the mechanism of the machine without departing from the spirit or scope of the invention; therefore, without limiting myself to the exact embodiment shown and described, what I claim is:—

1. In a sheet-feeding machine for feeding sheets from a pile or bank, the combination with means for grasping the top sheet of the bank at one corner, of means to operate said grasping-means to feed said sheet diagonally forward in a direction oblique to its side.

2. In a sheet-feeding machine for feeding sheets from a pile or bank, the combination with means to lift the top sheet of the bank at one of its forward corners, of means to feed the lifted sheet diagonally forward by a pull on its corner in a direction oblique to its side.

3. In a sheet-feeding machine for feeding sheets from a pile or bank, the combination with a separator-device for separating the top sheet from the bank, of means for operating said separator-device to feed the separated sheet diagonally forward in a direction oblique to its side.

4. In a sheet-feeding machine for feeding sheets from a pile or bank, the combination with a separator-device for lifting the top sheet from the bank at one corner only, of means to operate the separator-device after the lifting of the sheet to feed the latter diagonally forward in a direction oblique to its side.

5. In a sheet-feeding machine, the combination of a separator-device having means to operate on one corner of the top sheet of the bank to lift the sheet therefrom, and means to move the separator-device bodily to draw the sheet diagonally forward in a direction oblique to its side.

6. In a sheet-feeding machine, the combination of a separator-device having means to lift one corner of a sheet by suction, means coöperating therewith to grip said sheet at its edge, and mechanism to operate the gripping-means to draw the sheet diagonally forward in a direction oblique to its side.

7. In a sheet-feeding machine, the combination of a sheet-separator having suction-means for lifting the sheet by its corner, positively operated means for gripping the raised sheet at its edge, and means for operating the gripping-means to draw the sheet diagonally forward in a direction oblique to its side.

8. In a sheet-feeding machine, the combination of a sheet-separator having means operating on the top sheet of the bank to raise it from the sheets underneath, of means to actuate said separator-means to shake the sheet to cause a current of air to pass below it to free it from the sheets underneath.

9. In a sheet-feeding machine, the combination of a sheet-separator having means to raise one corner of a sheet from the bank of sheets underneath, of means coöperating therewith to grip the raised sheet at its edge, and means to operate the gripping-device to agitate the sheet from its corner to shake it free from the other sheets of the bank.

10. In a sheet-feeding machine, the combination of a sheet-separator having a suction-lifter adapted to be pressed down against the top of a sheet, means to operate the suction-lifter to raise one corner of the sheet, means coöperating with the suction-lifter to grip the sheet positively at its edge, and means to actuate the gripping-means to shake the sheet free from those underneath and to draw it diagonally forward in a direction oblique to its side.

11. In a sheet-feeding machine, the combination of a sheet-separator having a suction-shoe adapted to be carried into engagement with the top-sheet of the bank, means to operate the shoe to raise the sheet at its corner, means coöperating with the shoe to positively grip the raised sheet thereagainst, and means to move the shoe and its gripping-means to carry the sheet diagonally forward.

12. In a sheet-feeding machine, the combination of a sheet-separator having a suction-lifter, means to operate the lifter to raise the sheets individually from the bank, means to grip the sheets positively on the lifter, means to actuate the lifter with a quick reversal of movement to shake each sheet free from those underneath, and means to move the lifter to carry the sheets forward from the bank.

13. In a sheet-feeding machine, the combination of a sheet-separator having a suction-shoe adapted to be carried into engagement with the top sheet of the bank, means to operate the shoe to raise the sheet from the bank, means coöperating with the shoe to positively grip the raised sheet thereagainst, and means to actuate the shoe to shake the sheet with a quick reversal of movement to free it from the sheets underneath.

14. In a sheet-feeding machine, the combination of a sheet-separator having a suction-lifter for successively operating on the individual sheets in the bank, of means to actuate said lifter to raise the top sheet from the bank and to carry it forward therefrom, and means to then insert the lifter under the edge of the last sheet operated upon to cause it to raise and carry forward the next succeeding sheet in the bank.

15. In a sheet-feeding machine, the combination of a sheet-separator for separating the sheets individually from the bank comprising means to lift the top sheet at its corner, means to operate the lifting-means to feed the sheet diagonally forward, and means to operate said lifting-means to cause it to release one sheet and to reach in under its edge to engage the next succeeding sheet to manipulate the latter in the manner as first described.

16. In a sheet-separator for sheet-feeding machines, the combination with a lifter for raising the sheets individually from the bank, of means to operate the lifter to cause it to draw the sheet diagonally forward on the bank, and means to operate the lifter to cause it to release the sheet first fed forward and to reach in under its edge to raise and feed forward the next sheet, with its action continuous throughout the whole operation of the machine.

17. In a sheet-separator for sheet-feeding machines, the combination with a suction-lifter, of means to operate the lifter to raise the sheets individually from the bank, means coöperating with the lifter to grip the edge of each sheet to draw it forward from the bank, means to release the gripping-means and carry the lifter away from the side of the sheet, and means to insert the lifter under the edge of the sheet first operated upon to lift and feed forward the next sheet on the bank.

18. In a sheet-separator for sheet-feeding machines, the combination with a suction-lifter, of means to operate the lifter to raise the sheets individually from the bank, means coöperating with the lifter to grip the edge of the sheet, means for operating the lifter to draw the sheet diagonally forward on the bank, means to release the gripping-means and carry the lifter away from the side of the sheet, and means to insert the lifter in under the sheet first operated upon to adapt it to act on the next sheet in the bank with the same cycle of operations.

19. In a sheet-feeding machine, the combination with a sheet-separator, of means for feeding a bank of sheets thereto, means for lifting the sheets individually from the bank, means for gripping the raised sheet and drawing it forward from the bank, edge-grippers for receiving the moving sheet to feed it forward and upward from the separator, means for releasing the first gripping-means from the sheet after it has been seized by the edge-grippers, and means for inserting the lifting-means under the feeding sheet to adapt it to act on the next sheet in the bank before the first sheet is fed clear therefrom.

20. In a sheet-feeding machine, the combination with a sheet-separator, of means for feeding a bank of sheets thereto, a lifter for raising the sheets individually from the bank, means to grip the raised sheet on the lifter, means for operating the lifter to draw the sheet forward from the bank, edge-grippers for seizing the sheet as it draws forward on the bank to deliver it therefrom, means to release the first gripping-means from the sheet after it has been seized by the edge-grippers, means to withdraw the lifter and its gripping-means away from the side of the sheet being fed by the edge-grippers, and means to insert the lifter and its gripping-means under the sheet being fed to adapt it to act on the next sheet in the bank.

21. In a sheet-feeding machine, the combination with a sheet-separator, of a suction-arm, means to operate the arm to bring it successively into contact with the sheets in the bank, means to actuate the arm to raise the top sheet from the bank, a positive gripper, means to operate the gripper to seize the edge of the raised sheet, means to move the arm and gripper in unison to carry the sheet forward on the bank, means to release the gripper from the sheet, means to withdraw the arm and gripper away from the side of the sheet first operated upon, and means to insert the arm under the edge of the sheet to bring it into position to operate on the next sheet in the bank.

22. In a sheet-separator for sheet-feeding machines, the combination with a sliding crosshead, of a suction-arm mounted on the crosshead, means to actuate the arm to bring it into contact with the top sheet of the bank, means to raise the arm to lift the corner of the sheet, means to grip the sheet on the arm, means to slide the crosshead to cause the arm to draw the sheet diagonally forward, means to release the grip of the arm on the sheet, and means to return the crosshead to its initial position to bring the arm into position to operate on the next sheet in the bank.

23. In a sheet-separator for sheet-feeding machines, the combination with a sliding crosshead, of a suction-arm mounted on the crosshead, means to operate the arm to lift a sheet of paper from the bank, a gripper-arm mounted on the crosshead to swing into engagement with the suction-arm to grip the paper thereagainst, means to operate the gripper-arm, and means to reciprocate the crosshead to cause the paper to be drawn forward from the bank and to then return the suction-arm into position to operate on the next sheet underneath.

24. In a sheet-separator for sheet-feeding machines, the combination with a paper-table for supporting a bank of sheets, of a crosshead adapted to be reciprocated in relation to the table, a suction-arm mounted on the crosshead, means to operate the arm to cause it to lift the top sheet from the table, means to grip the sheet on the arm, and means to move the crosshead obliquely in relation to the side of the paper-table to draw the sheet diagonally forward therefrom.

25. In a sheet-separator for sheet-feeding machines, the combination with a paper-table for supporting a bank of sheets, of a track arranged at an angle to the side of the table, a crosshead slidable on the track, a suction-arm on the crosshead, means to operate the arm to cause it to raise the corner of the top sheet of the bank, means to grip the sheet on the arm, and means to slide the crosshead to draw the sheet diagonally forward from the paper-table.

26. In a sheet-separator for sheet-feeding machines, the combination with a slidable crosshead, of a suction-arm pivoted to swing on a vertical axis and hinged to rock on a horizontal axis on the crosshead, means to rock the arm to carry it into engagement with the top sheet in a bank and to then lift the corner of the sheet, means to grip the sheet on the arm, means to slide the crosshead to draw the sheet diagonally forward from the bank, means to release the grip of the arm on the sheet, means to swing the arm clear of the edge of the sheet, means to return the crosshead to its initial position, and means to swing the arm back into place above the corner of the next sheet on the bank.

27. In a sheet-separator for sheet-feeding machines, the combination with a slidable crosshead, of a suction-arm mounted on the crosshead to swing in a horizontal plane and to rock in a vertical plane, means to rock the arm downwardly to engage the sheet, means to raise the arm to lift the corner of the sheet, means to move the crosshead to draw the sheet diagonally forward, means to release the arm from the sheet, means to swing the arm to withdraw it from the side of the sheet, means to slide the crosshead to insert the arm under the sheet, and means to swing the arm back into position above the next sheet underneath.

28. In a sheet-separator for sheet-feeding machines, the combination with a slidable crosshead, of a suction-arm mounted to rock and swing on the crosshead, resilient-means for rocking the arm downwardly to engage it with the sheet, means to raise the arm to lift the corner of the sheet, detent-means for holding the arm in its raised position, means to slide the crosshead to cause the arm to draw the sheet diagonally forward, means to swing the arm to carry it away from the side of the sheet, means to return the crosshead to its first position, means to swing the arm back into place above the next sheet on the bank, and means to release the detent-means to allow the arm to be carried down into engagement with the next sheet.

29. In a sheet-separator for sheet-feeding machines, the combination with the paper-table, of a crosshead adapted to be reciprocated in relation thereto, a suction-arm on the crosshead, means to rock the arm into engagement with a sheet of paper on the table, means to raise the arm to lift the corner of the sheet, detent-means to lock the arm in raised position, means coöperating with the arm to grip the paper thereon, means to slide the cross-head to draw the sheet diagonally forward, means to swing the arm away from the edge of the paper, means to return the crosshead to its first position, means to swing the arm back to its first position, and means to release the detent-means to cause the arm to be rocked into engagement with the next sheet on the table.

30. In a sheet-separator for sheet-feeding machines, the combination with a reciprocatable crosshead, of a suction-arm on the crosshead, resilient-means for rocking the arm down into engagement with the sheet, a lever for rocking the arm upwardly to raise the sheet, a slide for operating the lever, detent-means for maintaining the arm in raised position, a cam for reciprocating the crosshead, and means on the cam for releasing the detent-means and for operating the slide to return the arm to its raised position.

31. In a sheet-separator for sheet-feeding machines, the combination with a slidable crosshead, of a suction-arm on the crosshead, a spring for rocking the arm down into engagement with the sheet, a rockable lever, a toggle connection between the lever and the suction-arm, a slide to rock the lever to raise the arm, a detent-arm for maintaining the slide in position with the suction-arm raised, a cam for reciprocating the crosshead, means to rotate the cam, and means turning with the cam to release the detent-arm from the slide and to then engage the slide to move it to raise the suction-arm.

32. In a sheet-separator for sheet-feeding machines, the combination with a slidable crosshead, of an arm mounted to rock on the crosshead, a spring for carrying the arm down into engagement with the sheet, a rockable lever, means connecting the lever with the arm to raise the latter, a slide to rock the lever, detent-means to lock the slide with the arm raised, means to release the detent-means to allow the arm to drop, and means to remove the slide to raise the arm to its initial position again.

33. In a sheet-separator for sheet-feeding machines, the combination with a rockable suction-arm, of means to rock the arm down into engagement with the sheet, means to raise the arm to lift the corner of the sheet, means to grip the sheet on the arm, means to rock the arm back with a quick reversal of movement to shake the sheet free from those underneath, means to maintain the arm in raised position with the sheet lifted, and means to move the arm to draw the sheet diagonally forward.

34. In a sheet-separator for sheet-feeding machines, the combination with a suction-arm, of means to operate the arm to engage it with a sheet, means to raise the arm to lift the corner of the sheet, a gripper for gripping the sheet against the arm, a spring to operate the gripper, detent-means for normally maintaining the gripper inoperative, and means to release the detent-means to cause the gripper to act while the arm is being raised to lift the sheet.

35. In a sheet-separator for sheet-feeding machines, the combination with a rockable suction-arm, of means to rock the arm to engage it with the sheet, means to raise the arm to lift the corner of the sheet, a gripper for positively gripping the sheet against the arm, a spring to operate the gripper, detent-means for maintaining the gripper inoperative, and means operated by the upward movement of the arm to release the detent-means to allow the gripper to act.

36. In a sheet-separator for sheet-feeding machines, the combination with a suction-shoe adapted to lift a sheet of paper, of a positive gripper having a jaw slidable across the shoe into wedging engagement therewith, and means to operate the gripper to cause its jaw to grip the sheet against the shoe.

37. In a sheet-separator for sheet-feeding machines, the combination with a suction-shoe provided with air openings, means to exhaust the air through the shoe to hold the paper thereagainst, a positive gripper having a jaw having inclined sides adapted to straddle the shoe, and means to carry the jaw into wedging engagement with the shoe to grip the paper against the shoe.

38. In a sheet-separator for sheet-feeding machines, the combination with a suction-shoe having an angular, contact face provided with perforations, means to exhaust the air from the shoe to suck the paper against its face, and a positive gripper formed with a jaw having divergent sides adapted to slide over the shoe with a wedging action to bind the paper against the shoe.

39. In a sheet-feeding machine, the combination with means for feeding a bank of sheets, of separator-means for grasping the top sheet and feeding it forward in a direction oblique to its edge, and a series of grippers acting to grip the forward edge of the lifted sheet as it feeds thereto to raise it away from the separator-means after it has been released thereby.

40. In a sheet-feeding machine, the combination with separator-means for grasping the top sheet of a pile or bank at one corner, of means to feed the sheet diagonally forward by a pull on its corner, and means to grip the sheet at a plurality of points along its forward edge to raise it away from the bank after it is released by the separator-means.

41. In a sheet-feeding machine, the combination with a separator-device for separating the top sheet from the pile at one corner and feeding it forward therefrom in a direction oblique to its side, of grippers for gripping the forward edge of the sheet as it is fed thereto by the separator, and means to operate the grippers to raise the sheet away from the pile along its whole width while feeding it off therefrom.

42. In a sheet-feeding machine, the combination with a separator-device for lifting the top sheet from the bank or pile, of a series of revolving grippers for positively gripping the forward edge of the sheet after it has been lifted by the separator, and means to operate said grippers to successively grip the sheets and carry them forward and upward from the separator-device to deposit them in overlapped relation one upon another.

43. In a sheet-feeding machine, the combination with a separator-device for lifting the top sheet from the bank or pile, of a plurality of grippers revolving about an axis parallel with the forward edge of the sheet, and means to operate the grippers to cause them to successively grip the sheets lifted by the separator and to feed them upward and forward therefrom to deposit them in overlapped relation.

44. In a sheet-feeding machine, the combination with a separator-device for successively lifting the top sheets of the pile or bank and feeding them forward therefrom, of a plurality of grippers revolving past the edges of the sheets in parallel relation thereto, and means to operate said grippers to cause them to grip each lifted sheet to carry it upward and forward and to then release it to return for the next sheet to carry it forward and deposit it in overlapped relation on the first sheet.

45. In a sheet-feeding device for printing-presses or the like, the combination with means for separating the sheets one at a time from the pile or bank, of means operating in synchronism therewith for successively gripping the edges of the sheets to carry them upward and forward from the separating-means to deposit them in overlapped relation one upon another for delivery to the gages or drop-guides of the press.

46. In a sheet-feeding device, the combination with means for separating the sheets one at a time from the pile or bank, of means operating in synchronism therewith for gripping the edge of each sheet as it is lifted from the bank, and means for operating the gripping-means to carry the sheet upward and forward from the bank and to then return for another sheet.

47. In a sheet-feeding device for printing-presses or the like, the combination with means for separating the sheets individually from the pile or bank, of a series of edge-grippers revolved about an axis parallel with and in advance of the forward edge of the sheets, means to revolve the grippers with a step-by-step motion, and means to actuate the grippers during their revolution past the sheets to cause them to successively grip the edges thereof to raise the sheets off from the bank and carry them forward therefrom to deposit them in predetermined relation for delivery to the feeding-mechanism of the press.

In testimony whereof I affix my signature in presence of two witnesses.

THOMAS A. BRIGGS.

Witnesses:
HERBERT K. ALLARD,
GEORGE A. WHITE, Jr.